(12) United States Patent
Sugimura et al.

(10) Patent No.: US 9,706,078 B2
(45) Date of Patent: *Jul. 11, 2017

(54) INFORMATION PROCESSING APPARATUS, INFORMATION PROCESSING SYSTEM, AND DEVICE LINKAGE METHOD

(71) Applicant: Ricoh Company, Ltd., Tokyo (JP)

(72) Inventors: Kazunori Sugimura, Kanagawa (JP); Kiyohiro Hyo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,994

(22) Filed: May 21, 2015

(65) Prior Publication Data

US 2015/0256709 A1 Sep. 10, 2015

Related U.S. Application Data

(63) Continuation of application No. 13/419,895, filed on Mar. 14, 2012, now Pat. No. 9,069,516.

(30) Foreign Application Priority Data

Mar. 18, 2011 (JP) ................................ 2011-061366
Feb. 27, 2012 (JP) ................................ 2012-040730

(51) Int. Cl.
*G06F 3/00* (2006.01)
*H04N 1/32* (2006.01)
(Continued)

(52) U.S. Cl.
CPC ........... *H04N 1/32529* (2013.01); *G06F 3/14* (2013.01); *H04N 1/0097* (2013.01);
(Continued)

(58) Field of Classification Search
CPC ..... G06F 3/14; G06F 3/12; H04N 1/00; H04N 1/32529; H04N 1/00973; H04N 1/00204;
(Continued)

(56) References Cited

U.S. PATENT DOCUMENTS 6,262,805 B1 * 7/2001 Ishikawa ............ H04N 1/00206
358/1.14
6,452,695 B1 * 9/2002 Casey ................. H04N 1/00278
358/1.15
(Continued)

FOREIGN PATENT DOCUMENTS

EP 2 252 084 A1 11/2010
JP 2005-174027 A 6/2005
(Continued)

OTHER PUBLICATIONS

Office Action issued Nov. 4, 2015 in Japanese Patent Application No. 2012-040730.
(Continued)

*Primary Examiner* — Jing-Yih Shyu
(74) *Attorney, Agent, or Firm* — Oblon, McClelland, Maier & Neustadt, L.L.P.

(57) ABSTRACT

An information processing apparatus includes a user interface unit configured to receive a function execution request for processes, the function execution request containing designations of an input function and an output function; a search and linkage unit configured to acquire pieces of specifications information indicating functions of an input device and an output device from the respective devices, and generate, based on the pieces of specifications information, a linkage flow indicating an execution sequence and a combination of an input device and an output device which respectively have an input function and an output function designated in the function execution request, the devices executing the functions, respectively, in linkage with each
(Continued)

other; and a flow executing unit configured to send process requests to the input device and the output device designated in the linkage flow, respectively.

20 Claims, 35 Drawing Sheets

(51) Int. Cl.
G06F 3/14 (2006.01)
H04N 1/00 (2006.01)
(52) U.S. Cl.
CPC ..... *H04N 1/00204* (2013.01); *H04N 1/00474* (2013.01); *H04N 1/00949* (2013.01); *H04N 1/00973* (2013.01); *H04N 1/32101* (2013.01); *H04N 1/32502* (2013.01); *H04N 1/32539* (2013.01); *H04N 2201/0094* (2013.01)
(58) Field of Classification Search
CPC ........... H04N 1/32539; H04N 1/32101; H04N 1/0097; H04N 1/00474; H04N 1/00949; H04N 1/32502; H04N 2201/0094
See application file for complete search history.

(56) References Cited

U.S. PATENT DOCUMENTS

| | | | | |
|---|---|---|---|---|
| 6,553,431 B1* | 4/2003 | Yamamoto | ......... | H04N 1/32502 358/1.13 |
| 6,609,162 B1* | 8/2003 | Shimizu | ........... | H04L 12/24 709/203 |
| 7,124,212 B2* | 10/2006 | Shimizu | ........... | H04L 12/24 709/239 |
| 7,755,788 B2* | 7/2010 | Corona | .............. | H04N 1/00278 358/1.15 |
| 8,237,958 B2 | 8/2012 | Emori | | |
| 8,352,647 B2* | 1/2013 | Maezawa | ........... | G06F 21/6209 710/29 |
| 8,508,789 B2* | 8/2013 | Yamada | ............. | H04N 1/00408 358/1.2 |
| 2001/0052995 A1* | 12/2001 | Idehara | ................. | G06F 3/1204 358/1.15 |
| 2003/0115263 A1* | 6/2003 | Tran | ....................... | G06Q 10/10 709/203 |
| 2005/0144161 A1 | 6/2005 | Hirota | | |
| 2005/0270587 A1* | 12/2005 | Yamakawa | .............. | H04N 1/00 358/448 |
| 2005/0286080 A1* | 12/2005 | Lee | .................... | H04N 1/00222 358/1.15 |
| 2006/0200564 A1 | 9/2006 | Watanabe et al. | | |
| 2006/0224939 A1* | 10/2006 | Namikata | .......... | H04N 1/00002 715/201 |
| 2007/0168553 A1* | 7/2007 | Jones | ...................... | H04L 67/36 709/245 |
| 2008/0155568 A1* | 6/2008 | Wakana | ............... | H04N 1/0032 719/321 |
| 2009/0063612 A1 | 3/2009 | Hyo | | |
| 2009/0237728 A1* | 9/2009 | Yamamoto | ............ | G06F 3/1454 358/1.15 |
| 2010/0002254 A1 | 1/2010 | Hyo | | |
| 2010/0220352 A1* | 9/2010 | Hyo | .................. | G03G 15/5075 358/1.15 |
| 2011/0067088 A1 | 3/2011 | Hyo | | |
| 2011/0143789 A1 | 6/2011 | Watanabe et al. | | |
| 2012/0270587 A1 | 10/2012 | Watanabe et al. | | |

FOREIGN PATENT DOCUMENTS

| | | |
|---|---|---|
| JP | 2006-190088 A | 7/2006 |
| JP | 2008-102903 A | 5/2008 |
| JP | 2009-71727 A | 4/2009 |
| JP | 2009-230253 A | 10/2009 |
| JP | 4403138 | 11/2009 |
| JP | 4403139 | 11/2009 |

OTHER PUBLICATIONS

Extended European Search Report Issued May 17, 2013 in Patent Application No. 12159517.7.
Japanese Office Action issued May 10, 2016 in Patent Application No. 2012-040730 (without English Translation).

* cited by examiner

FIG.4

| DEVICE INFORMATION | | | SPECS INFORMATION | | | | | |
|---|---|---|---|---|---|---|---|---|
| DEVICE NAME | IP | EXTENDED FIELD | FUNCTION NAME | INPUT | OUTPUT | PARAMETER [EXTENDED FIELD] | | |
| | | | | | | COLOR | RESOLU-TION | MAX SIZE [EXTENDED FIELD] |
| MFP #1 | 192.168.XXX.XXX | | SCAN | - | JPEG/TIFF | fullcolor | 600*600 | |
| PROJECTOR #1 | 192.168.XXX.XXX | | PROJEC-TION | JPEG | - | | 800*600 | |

FIG.8

| DEVICE INFORMATION | | SPECS INFORMATION | | | | | |
|---|---|---|---|---|---|---|---|
| DEVICE NAME | IP | | FUNCTION NAME | INPUT | OUTPUT | PARAMETER [EXTENDED REGION] | | |
| | | EXTENDED REGION | | | | COLOR | RESOLU-TION | MAX SIZE |
| MFP #1 | 192.168.XXX.XXX | | SCAN | - | JPEG | fullcolor | 600*600 | |
| | | | PRINT | RPCS | - | fullcolor | | |
| PROJECTOR #1 | 192.168.XXX.XXX | | PROJEC-TION | JPEG | - | | 800*600 | |
| PROJECTOR #2 | 192.168.XXX.XXX | | PROJEC-TION | TIFF | - | | | |

| DEVICE/SERVICE | FIRST/LAST | INPUT | OUTPUT |
|---|---|---|---|
| MFP #1 | FIRST | | JPEG |
| MFP #2 | FIRST | | JPEG/PDF |
| PROJECTOR #1 | LAST | JPEG | |
| PROJECTOR #2 | LAST | TIFF | |
| PROJECTOR #3 | LAST | PDF | |
| PROCESS #1 | | JPEG | PDF |
| PROCESS #2 | | JPEG/TIFF | PDF |
| PROCESS #3 | | PDF | JPEG |

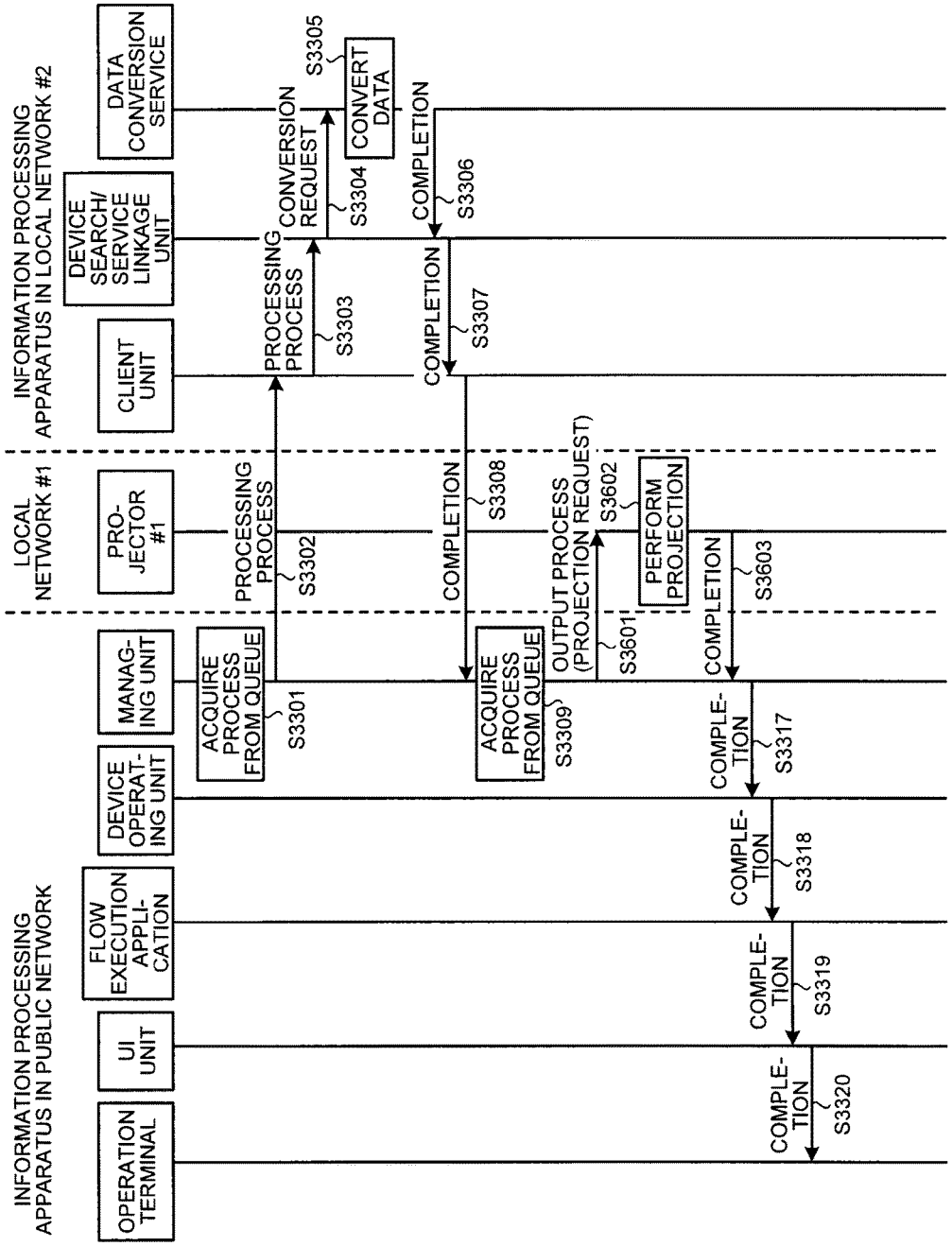

INFORMATION PROCESSING APPARATUS, INFORMATION PROCESSING SYSTEM, AND DEVICE LINKAGE METHOD

CROSS-REFERENCE TO RELATED APPLICATIONS

The present application is a continuation of U.S. application Ser. No. 13/419,895 filed Mar. 14, 2012, which claims priority to Japanese Patent Application No. 2011-061366 filed on Mar. 18, 2011 and Japanese Patent Application No. 2012-040730 filed on Feb. 27, 2012, the entire contents of which are incorporated herein by reference.

BACKGROUND OF THE INVENTION

1. Field of the Invention

The present invention relates to an information processing apparatus, an information processing system, and a device linkage method.

2. Description of the Related Art

Conventionally, to enable linkage between an image forming apparatus and an input/output device other than the image forming apparatus, there is a method of developing an embedded application by using a software development kit (SDK) that is provided for developing applications to be installed in the image forming apparatus.

Japanese Patent No. 4403138 and Japanese Patent No. 4403139 disclose another method in which an interface that can control functions of an image forming apparatus is provided in advance in the image forming apparatus to configure an application that enables linkage between the image forming apparatus and the other input/output devices by an external server or the like.

However, in recent years, there is a demand to enable linkage between an image forming apparatus and an input/output device other than the image forming apparatus as well as linkage among an image forming apparatus, an input/output device, and a service on a cloud computer. Furthermore, a linkage object may be changed dynamically.

Therefore, there is a need for a platform that enables not only linkage between an image forming apparatus and other devices but also linkage between various input/output devices in offices or between input/output devices and cloud services etc., and to easily enable linkage by developing an application on the platform.

SUMMARY OF THE INVENTION

It is an object of the present invention to at least partially solve the problems in the conventional technology.

According to an embodiment, there is provided an information processing apparatus connected to at least one input device and at least one output device via a network. The information processing apparatus includes a user interface unit configured to receive a function execution request for a plurality of processes, the function execution request containing designations of an input function and an output function; a search and linkage unit configured to acquire pieces of specifications information indicating functions of the at least one input device and the at least one output device from the respective devices, and generate, based on the pieces of specifications information, a linkage flow indicating an execution sequence and a combination of an input device having the input function designated in the function execution request and an output device having an output function designated in the function execution request among the at least one input device and the at least one output device, the input device and the output device executing the input function and the output function, respectively, in linkage with each other; and a flow executing unit configured to send process requests to the input device and the output device designated in the linkage flow, respectively.

According to another embodiment, there is provided an information processing system that includes the information processing apparatus according to the above embodiment; the at least one input device; the at least one output device; and an operation terminal. The operation terminal includes a device searching unit configured to search for the input device and the output device to establish an ad-hoc network connection with the input device and the output device obtained by search, and to receive pieces of identification information for identifying the input device and the output device from the input device and the output device that have established the ad-hoc network connection, respectively; and an execution requesting unit configured to send function execution requests for executing functions of the input device and the output device, respectively, to the information processing apparatus based on the pieces of designation information. The information processing apparatus receives the function execution requests and causes the input device and the output device corresponding respectively to the pieces of identification information designated in the function execution requests to execute the respective functions.

According to still another embodiment, there is provided an information processing system that includes the information processing apparatus according to the above embodiment, referred to as a first information processing apparatus, the network being referred to as a first network; and a second information processing apparatus connected to the first information processing apparatus in a second network. The first information processing apparatus includes a client unit configured to send the pieces of specifications information obtained by the specifications managing unit to the second information processing apparatus; and a device operating unit configured to causes the input device to execute the corresponding input function and causes the output device to execute the corresponding input function in response to a request received from the second information processing apparatus. The second information processing apparatus includes a storage unit; a managing unit configured to receive the pieces of specifications information and store the received pieces of specifications information in the storage unit; a user interface unit configured to receive a function execution request for one or more processes, the function execution request containing designations of an input function and an output function, via an operation terminal connected to the second network; and a linkage unit configured to generate, based on the pieces of specifications information stored in the storage unit, a linkage flow indicating an execution sequence and a combination of an input device having the input function designated in the function execution request and an output device having an output function designated in the function execution request among the at least one input device and the at least one output device, the input device and the output device executing the input function and the output function, respectively, in linkage with each other. The managing unit of the second information processing apparatus sends process requests to the input device and the output device designated in the linkage flow, respectively, to the first information processing apparatus.

According to still another embodiment, there is provided an information processing system that includes at least one input/output device; and an operation terminal. The operation terminal includes a device searching unit configured to search for the input/output device to establish an ad-hoc network connection with the input/output device obtained by search, and to receive a command to execute the function by the input/output device from the input/output device that has established the ad-hoc network connection; and an execution requesting unit configured to issue the command to the input/output device. The input/output device sends the command to the operation terminal when receiving a request to provide the command from the operation terminal, and executes the function when receiving the command from the operation terminal.

According to still another embodiment, there is provided a device linkage method implemented by an information processing apparatus connected to at least one input device and at least one output device via a network. The device linkage method includes receiving a function execution request for a plurality of processes, the function execution request containing designations of an input function and an output function; acquiring pieces of specifications information indicating functions of the at least one input device and the at least one output device from the respective devices; generating, based on the pieces of specifications information, a linkage flow indicating an execution sequence and a combination of an input device having the input function designated in the function execution request and an output device having an output function designated in the function execution request among the at least one input device and the at least one output device, the input device and the output device executing the input function and the output function, respectively, in linkage with each other; and sending process requests to the input device and the output device designated in the linkage flow, respectively.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 illustrates a comparative table of specifications information of a multifunction peripheral #1 and a projector #1;

FIG. 8 illustrates a comparative table of specifications information of the multifunction peripheral #1, the projector #1, and a projector #2;

FIG. 37 is a sequence diagram of a flow of a flow execution process of the eleventh embodiment.

DETAILED DESCRIPTION OF THE PREFERRED EMBODIMENTS

Exemplary embodiments of an information processing apparatus, an information processing system, a device linkage method, and a computer program product according to the present invention will be explained in detail below with reference to the accompanying drawings.

First Embodiment

Figure 1:
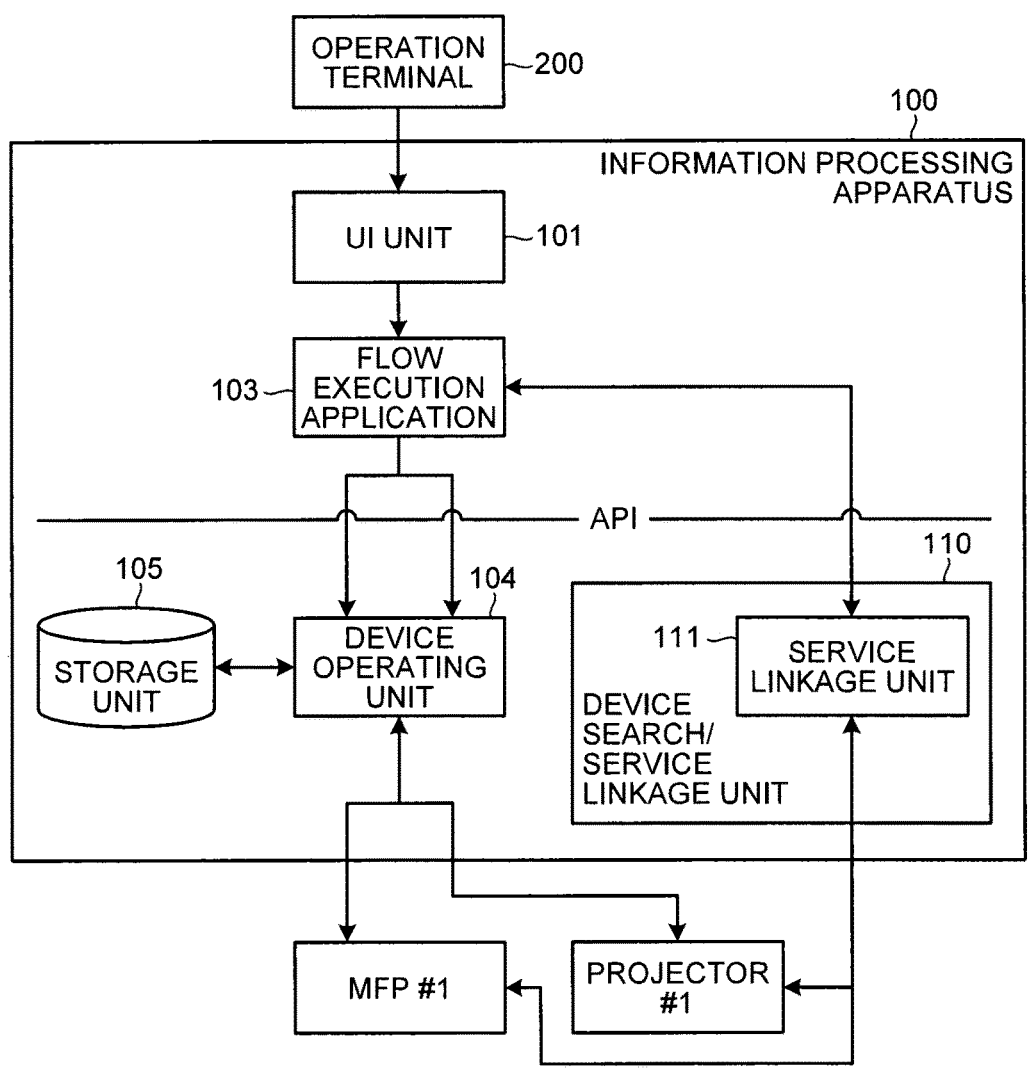
FIG. 1 is a block diagram of a network configuration of an information processing system and a functional configuration of an information processing apparatus of a first embodiment.

FIG. 1 is a block diagram of a network configuration of an information processing system and a functional configuration of an information processing apparatus of a first embodiment. As illustrated in FIG. 1, the information processing system of the present embodiment includes an information processing apparatus 100, an operation terminal 200, and a plurality of input devices and output devices including a multifunction peripheral (MFP) #1 and a projector #1, which are connected to one another via a network, such as the Internet or a local area network (LAN).

The operation terminal 200 is a terminal that receives input of a function execution request for a desired input function and a desired output function from a user and transmits the request to the information processing apparatus 100 via the network. Examples of the operation terminal 200 include, but not limited to, a personal computer (PC) and a mobile terminal.

The information processing apparatus 100 functions as a platform that receives the function execution request from the operation terminal 200; generates a linkage flow, in which a combination of an input device and an output device for executing the functions and an execution sequence are defined; and causes the input device and the output device to execute the functions in accordance with the linkage flow. Examples of the information processing apparatus 100 include, but not limited to, a computer including a server device, a workstation, and a PC; an image forming apparatus including an MFP and a copier; an information projecting apparatus including a projector; and a mobile terminal including a mobile phone, a personal data assistance (PDA), and a tablet terminal.

Each of the MFP #1 and the projector #1 serves as an input device or an output device, executes own input function or output function, receives a request from the information processing apparatus 100, and transmits specifications information indicating own executable function to the information processing apparatus 100. Hereinafter, the word of "specifications" is represented as "SPECS" in the drawings.

Examples of the specifications information include an input data format, an output data format, and resolution. The specifications information varies depending on the devices. Details of the specifications information will be described later. In the present embodiment, each of the MFP #1 and the projector #1 can serve as an input device or an output device.

As illustrated in FIG. 1, the information processing apparatus 100 is partitioned into an upper layer and a lower layer by an application programming interface (API) as a boundary. The upper layer includes a user interface unit 101 (hereinafter, described as the "UI unit 101") and a flow execution application 103.

The UI unit 101 receives a function execution request for an input function and an output function from the operation terminal 200. In the present embodiment, the function execution request contains designations of an input function, an output function, an input device that executes the input function, and an output device that executes the output function as desired by a user. For example, the function execution request may be "scan (the MFP #1)+projection (the projector #1)".

Specifically, "scan" indicates the input function and "the MFP #1" indicates the input device that executes the input function "scan". Similarly, "projection" indicates the output function and "the projector #1" indicates the output device that executes the output function "projection". To identify the input device that executes the input function and the output device that executes the output function, IP addresses for identifying the respective devices are used; however, it is not limited to this.

The flow execution application 103 receives the function execution request from the UI unit 101, sends a linkage-flow generation request to a service linkage unit 111 of a device search/service linkage unit 110 by using the API, and receives a linkage flow (hereinafter, also described as a "flow") generated by the service linkage unit 111.

The flow execution application 103 sends a request for an input process to the input device and sends a request for an output process to the output device by using the API in accordance with the received linkage flow.

The API can receive the flow generation request, the request for the input process, and the request for the output process from the flow execution application 103 by using a predefined function in which a parameter or the like is specified. When receiving the flow generation request by using the function, the API sends the flow generation request to the service linkage unit 111 to cause the service linkage unit 111 to generate a flow. When receiving the requests for the input process and the output process by using the function, the API sends a process execution request for each of the processes to a device operating unit 104 to cause the device operating unit 104 to control the input device and the output device.

On the upper layer above the API, various applications (not illustrated) can be installed in addition to the flow execution application. The various applications can request execution of functions to enable linkage between services provided by the API, by using a function call defined by the API.

In other words, the API and the lower layer below the API serve as a platform for service linkage between applications (including the flow execution application 103). Details of the API will be explained in a second embodiment to be described later.

The information processing apparatus 100 mainly includes, in the lower layer below the API, the device search/service linkage unit 110 including the service linkage unit 111; the device operating unit 104; and a storage unit 105.

The service linkage unit 111 requests the input device and the output device, which are designated in the function execution request, to provide pieces of specifications information, and receives the pieces of specifications information from the input device and the output device. The service linkage unit 111 generates, based on the pieces of specifications information, a linkage flow indicating an execution sequence and a combination of an input device and an output device that respectively have the input function and the output function designated in the function execution request and that can execute the input function and the output function in linkage with each other.

Specifically, the service linkage unit 111 generates, based on the specifications information, a linkage flow, in which the input device and the output device designated in the function execution request sent by a user are identified and a parameter that is needed to execute the functions by linkage between the input device and the output device is also identified. Thereafter, the service linkage unit 111 sends the linkage flow, as a response, to the flow execution application 103.

Examples of the parameter needed to execute the functions by linkage of the input device and the output device include a data format that is commonly used as an output data format of the input device and an input data format of the output device, and an execution sequence for the input device and the output device.

Therefore, the flow execution application 103 can execute the input function and the output function in a linkage manner by only sending the parameter of the linkage flow generated by the service linkage unit 111 to the device operating unit 104 by using the API, without regard to a process of causing the devices to link each other.

Figure 2:
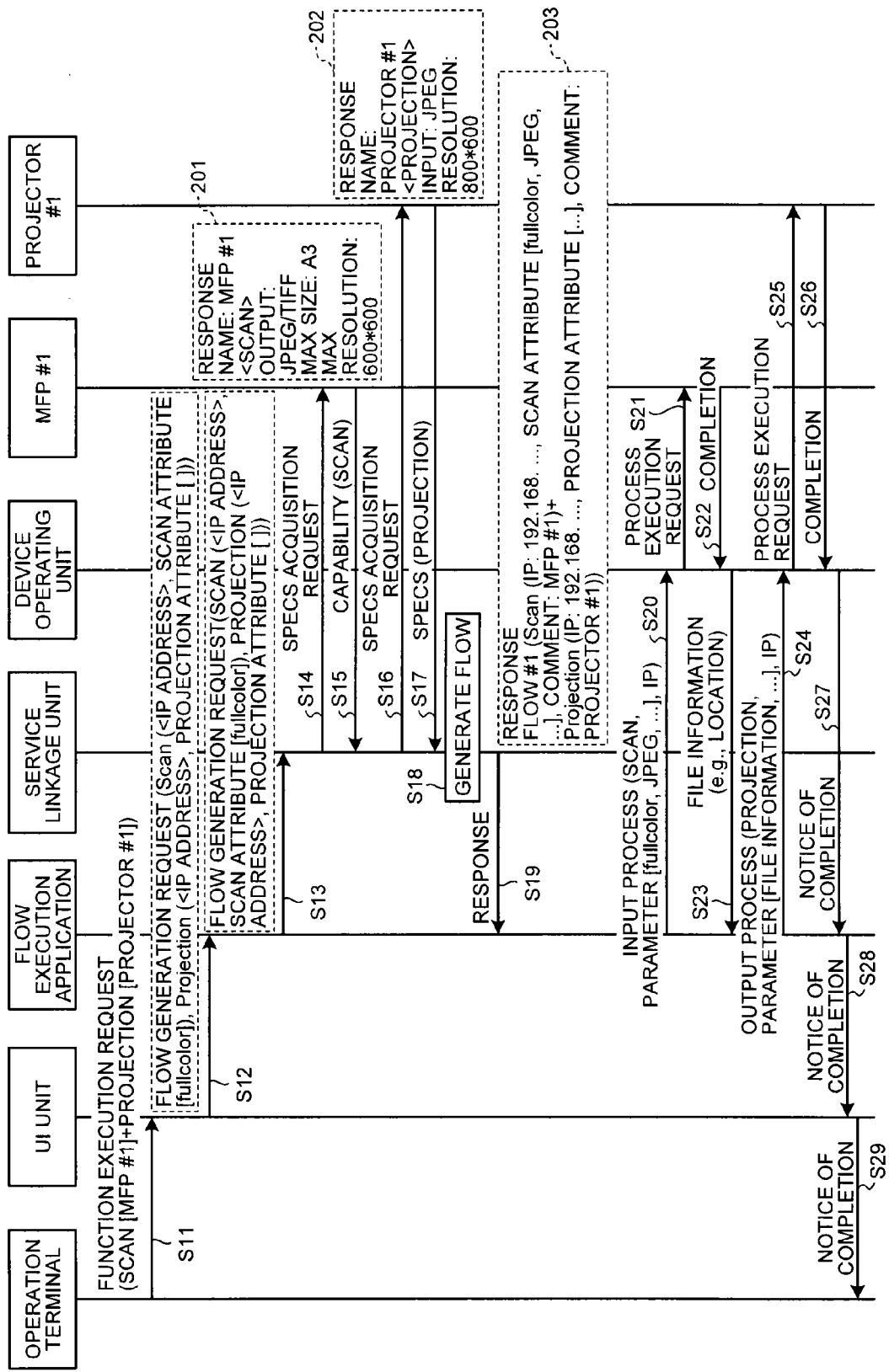
FIG. 2 is a sequence diagram of a linkage process of the first embodiment.

A concrete example of a device linkage process of the present embodiment with the above configuration will be explained below. FIG. 2 is a sequence diagram of the linkage process of the first embodiment. An example is explained in which a user inputs the function execution request for "scan (the MFP #1)+projection (the projector #1)" in the operation terminal 200.

Figure 3:
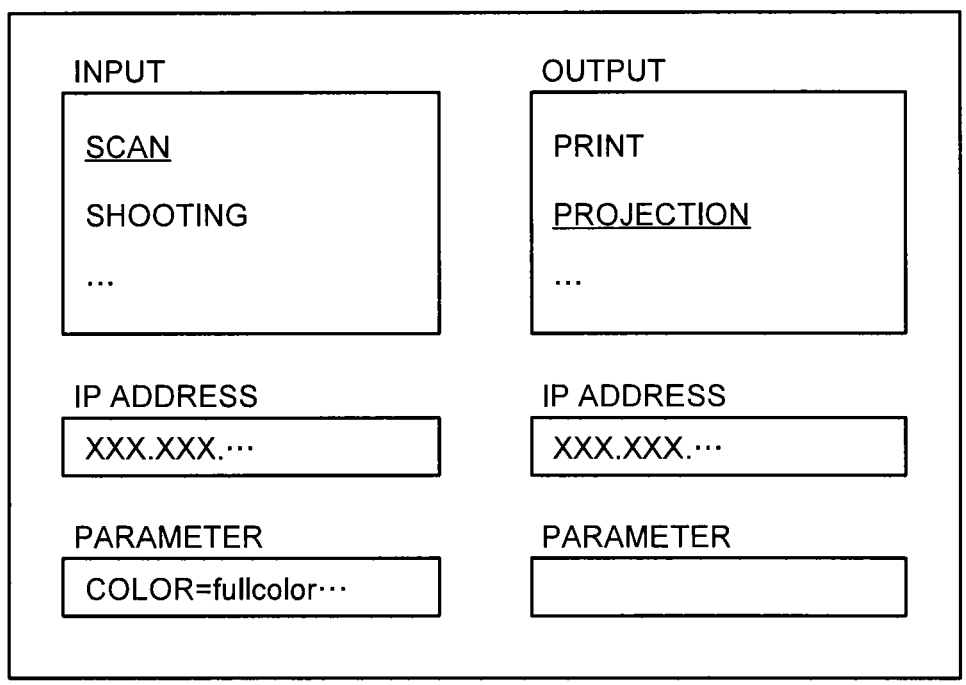
FIG. 3 is a schematic diagram illustrating an example of an input screen for a function execution request in the first embodiment.

FIG. 3 is a schematic diagram illustrating an example of an input screen for the function execution request in the first embodiment. The UI unit 101 of the information processing apparatus 100 displays the input screen illustrated in FIG. 3 on the operation terminal 200, and a user inputs an execution request for a desired function via the input screen. As illustrated in FIG. 3, the user specifies a desired input function, the IP address of an input device that executes the input function, and a parameter of the input function. The user also specifies a desired output function, the IP address of an output device that executes the output function, and a parameter of the output function.

Referring back to FIG. 2, the operation terminal 200 transmits the function execution request for "scan (the MFP #1)+projection (the projector #1)", which is specified by the user via the input screen, to the information processing apparatus 100 (Step S11).

The UI unit 101 of the information processing apparatus 100 receives the function execution request and sends, to the flow execution application 103, a flow generation request containing an input function (scan), an output function (projection), the IP address of the input device (the MFP #1), the IP address of the output device (the projector #1), and a parameter (e.g., an input attribute, such as monochrome/color, or a projection attribute), as designated in the function execution request (Step S12). The flow execution application 103 sends the flow generation request to the service linkage unit 111 by using the API (Step S13).

When receiving the flow generation request from the flow execution application 103, the service linkage unit 111 sends a specifications-information acquisition request to each of the MFP #1 and the projector #1 designated in the flow generation request (Steps S14 and S16), and acquires specifications information from each of the devices (Steps S15 and S17).

The service linkage unit 111 generates a linkage flow based on the specifications information (Step S18). In this example, the specifications information of the MFP #1 is denoted by 201 in FIG. 2 and the specifications information of the projector #1 is denoted by 202 in FIG. 2. FIG. 4 illustrates a comparative table of the specifications information of the MFP #1 and the projector #1.

In the example illustrated in FIG. 2 and FIG. 4, the specifications information of the MFP #1 indicates that the output format is "JPEG" or "TIFF" while the specifications information of the projector #1 indicates that the input format is "JPEG". In this case, the service linkage unit 111 generates a linkage flow for the MFP #1 and the projector #1 by configuring a parameter so that the MFP #1 outputs JPEG data through scanning. An exemplary linkage flow generated in this example is denoted by 203.

As denoted by 203, the linkage flow contains a designated function call (Scan( )) for the input function provided with the IP address of the input device (the MFP #1), a scan attribute (a designation of color/monochrome [fullcolor], an output data format [JPEG], and a comment on the input device (the MFP #1) as parameters, and contains a designated function call (Projection( )) for the output function provided with the IP address of the output device (the projector #1), a projection attribute, and a comment on the output device (the projector #1) as parameters, in an execution sequence.

Specifically, the function (Scan( )) for the input function and the function (Projection( )) for the output function provided by the API are written in the linkage flow together with the parameters.

The service linkage unit 111 sends the generated linkage flow to the flow execution application 103 (Step S19).

When the service linkage unit 111 determines that the input device and the output device cannot link each other as a result of comparison of the specifications information, the service linkage unit 111 returns an error indicating the impossibility of linkage to the flow execution application 103. The flow execution application 103 notifies the operation terminal 200 of the error indicating the impossibility of linkage via the UI unit 101.

Subsequently, the flow execution application 103 calls the functions designated in the linkage flow by using the API. Therefore, it becomes possible to enable linkage between the MFP #1 and the projector #1 without regard to a change in the parameters for a process of causing the MFP #1 and the projector #1 to link each other.

Specifically, the flow execution application 103 calls the function (Scan( )) for the input function with the specified parameters by referring to the received linkage flow, and sends a request for an input process to the device operating unit 104 by using the API (Step S20). The request for the input process contains scan as the input function, parameters for specifying color/monochrome (fullcolor) and the output data format (JPEG), and the IP address of the input device (the MFP #1).

When receiving the request for the input process, the device operating unit 104 sends a process execution request to the input device (the MFP #1) designated in the request for the input process (Step S21). When receiving a notice of completion of the process from the input device (the MFP #1) (Step S22), the device operating unit 104 stores the notice of completion and the received scanned image data in the storage unit 105. The device operating unit 104 then sends file information indicating a location of the scanned image data to the flow execution application 103 (Step S23).

When receiving the file information, the flow execution application 103 calls the function (Projection( )) of the output function registered in the linkage flow by specifying the file information as a parameter, and sends a request for an output process to the device operating unit 104 by using the API (Step S24). The request for the output process contains projection as the output function, a parameter such as the file information, and the IP address of the output device (the projector #1).

When receiving the request for the output process, the device operating unit 104 sends a process execution request to the output device (the projector #1) designated in the request for the output process (Step S25). When receiving a notice of completion of the process from the output device (the projector #1) (Step S26), the device operating unit 104 sends the notice of completion to the flow execution application 103 (Step S27). The notice of completion is sent from the flow execution application 103 to the UI unit 101 and is subsequently sent from the UI unit 101 to the operation terminal 200 (Steps S28 and S29).

As described above, according to the present embodiment, when a function execution request relating to input and output is received from a user, the service linkage unit ill acquires specifications information from the input device and the output device designated in the function execution request, and when the linkage is possible based on the specifications information, generates a linkage flow. Subsequently, the flow execution application 103 sends process execution requests to the input device and the output device based on the linkage flow. Therefore, even if the user does not know the specifications of the input device and the output device, it is possible to enable linkage between the input device and the output device to perform a desired input/output process. It is also possible to easily cause the input device and the output device to link each other.

Furthermore, according to the present embodiment, the flow execution application 103 sends the flow generation request to the service linkage unit 111 by using the API and sends execution requests for the input process and the output process to the device operating unit 104 by using the API. Therefore, it is possible to easily enable linkage between the input device and the output device without regard to a change in the parameters for a process of causing the input device and the output device to link each other.

Second Embodiment

In the first embodiment, the IP addresses of the input device and the output device are designated in the function execution request that is sent by a user via the operation terminal 200. In a second embodiment, linkage becomes possible even when a user sends a function execution request without designations of an input device and an output device.

Figure 5:
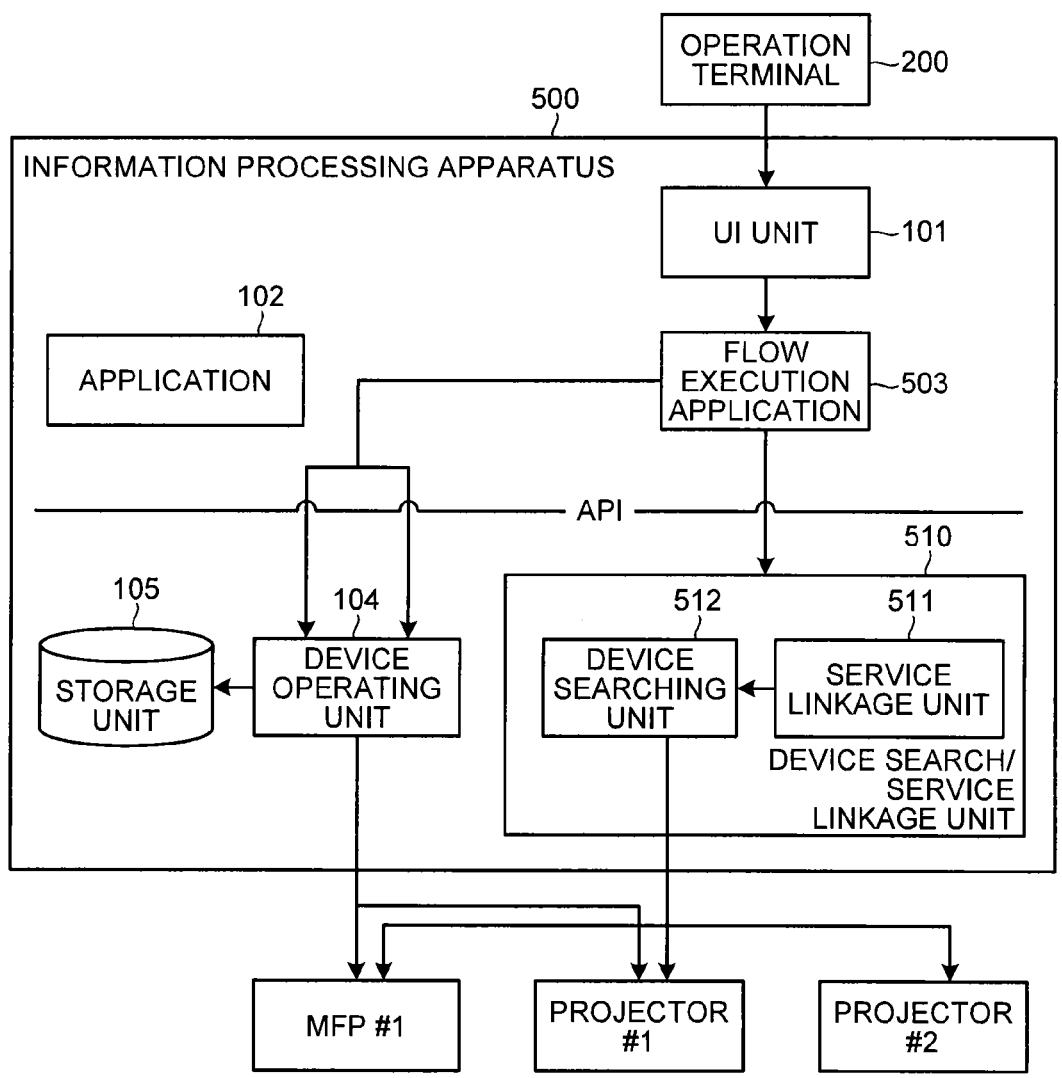
FIG. 5 is a block diagram of a network configuration of an information processing system and a functional configuration of an information processing apparatus of a second embodiment.

FIG. 5 is a block diagram of a network configuration of an information processing system and a functional configuration of an information processing apparatus of the second embodiment. As illustrated in FIG. 5, the information processing system of the present embodiment includes an information processing apparatus 500, the operation terminal 200, and a plurality of input devices and output devices including the MFP #1, the projector #1, and a projector #2, which are connected to one another via a network, such as the Internet or a LAN.

The operation terminal 200, the MFP #1, and the projector #1 have the same functions as described in the first embodiment. The projector #2 has different specifications (functions) from that of the projector #1.

As illustrated in FIG. 5, the information processing apparatus 500 includes the UI unit 101, a flow execution application 503, and an application 102 in an upper layer above the API. The information processing apparatus 500 mainly includes a device search/service linkage unit 510, the device operating unit 104, and the storage unit 105 in a lower layer below the API.

The UI unit 101, the device operating unit 104, and the storage unit 105 have the same functions and configurations as described in the first embodiment.

In the present embodiment, the UI unit 101 receives a function execution request for an input function and an output function from the operation terminal 200; however, the function execution request contains designations of an input function and an output function as desired by a user but does not contain designations of an input device that executes the input function and an output device that executes the output function. For example, the function execution request of the present embodiment may be "scan+projection". Here, "scan" is a designation of the input function and "projection" is a designation of the output function.

The flow execution application 503 receives the function execution request from the UI unit 101, sends a linkage-flow generation request to a service linkage unit 511 of the device search/service linkage unit 510 by using the API, and receives a linkage flow generated by the service linkage unit 511. The flow execution application 503 sends a request for an input process to the input device and sends a request for an output process to the output device, by using the API in accordance with the received linkage flow.

The device search/service linkage unit 510 mainly includes the service linkage unit 511 and a device searching unit 512.

The device searching unit 512 requests peripheral input devices and output devices connected to the network to provide specifications information, and receives the specifications information from the input devices and the output devices.

The service linkage unit 511 generates a linkage flow with designations of an input device and an output device that can link each other in accordance with the function execution request input by the user, on the basis of the specifications information received from the device searching unit 512. The specifications information and the linkage flow are the same as described in the first embodiment.

For example, when the UI unit 101 receives a function execution request for "scan+projection" from the operation terminal 200, the flow execution application 503 sends a flow generation request for "scan+projection" to the service linkage unit 511 by using the API.

When receiving the flow generation request, the device searching unit 512 searches for devices that can execute "scan" and "projection" (in the example in FIG. 5, the MFP

1, the projector #1, and the projector #2) from among the peripheral input devices and output devices.

The service linkage unit 511 performs matching of the specifications information on the basis of the specifications information acquired by the device searching unit 512, generates a linkage flow, and sends the linkage flow to the flow execution application 503.

The API will be described in detail below. In the present embodiment, a function of flow generation, a function of an input process, a function of an output process, and a function of a processing process are provided as the API.
1) Flow Generation
   <Input Parameter>
   names of a plurality of functions (e.g., scan+projection)
   parameter
   <Response>
   linkage flow
2) Input Process
   <Input Parameter>
   name of a function (e.g., scan)
   IP address
   parameter
   <Response>
   location of an image generated by the input
3) Output Process
   <Input Parameter>
   name of a function (e.g., projection)
   IP address
   parameter (including a location of an input image)
   <Response>
   only notice of completion
4) Processing Process
   <Input Parameter>
   name of a function (e.g., image format conversion)
   IP address
   parameter (including a location of an input image)
   <Response>
   location of an image generated by the input Therefore, the flow execution application 503 calls the function of flow generation in which input parameters are specified, and sends the flow generation request to the service linkage unit 511. Furthermore, the flow execution application 503 calls the function of the input process in which input parameters are specified, and sends, to the device operating unit 104, a request for an input process to be performed by the input device designated by the IP address. Moreover, the flow execution application 503 calls the function of the output process in which input parameters are specified, and sends, to the device operating unit 104, a request for an output process to be performed by the output device designated by the IP address. Furthermore, the flow execution application 503 calls the function of the processing process in which input parameters are specified, and sends, to the device operating unit 104, a request for a processing process to be performed by a service designated by the IP address.

For example, the flow execution application 503 calls the function of an input process in which scan is specified, so that image data scanned by the MFP #1 is stored in the storage unit 105 and location information is returned as a response. It is possible to return the image data itself as the response.

Subsequently, the flow execution application 503 calls the function of an output process in which projection and the location information of the image data are specified as parameters, so that the image data stored in the storage unit 105 is projected by the projector #2.

The device operating unit 104 interprets the contents of the requests for the input process and the output process, and executes operations of the input device and the output device.

As described above, the flow execution application 503 sends requests for processes by using the API. Therefore, the flow execution application 503 can execute each process without regard to differences between the devices.

Figure 6:
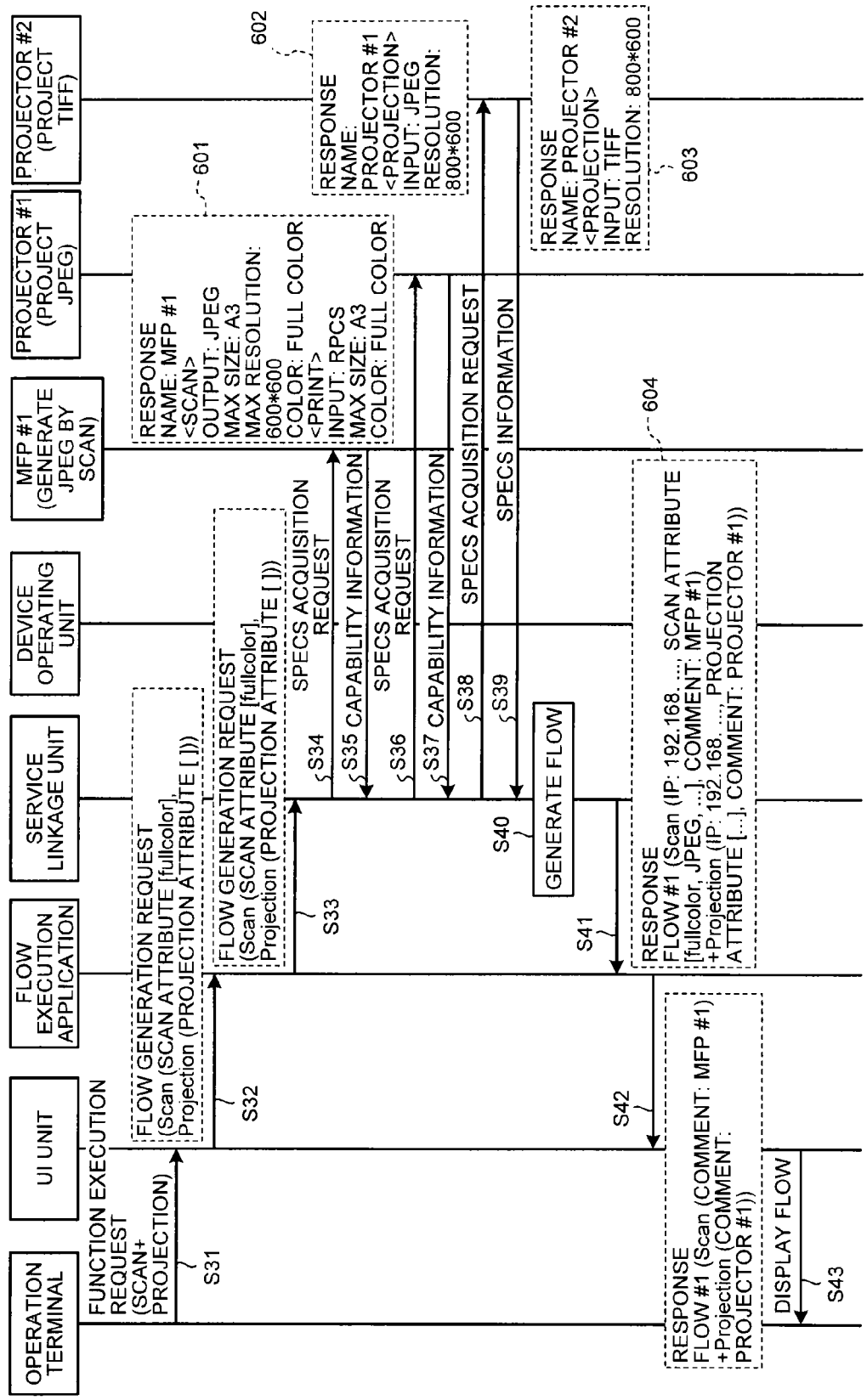
FIG. 6 is a sequence diagram from a process of requesting execution of functions to a process of displaying a linkage flow in a linkage process of the second embodiment.

A concrete example of a device linkage process of the present embodiment with the above configuration will be explained below. FIG. 6 is a sequence diagram from a process of requesting execution of functions to a process of displaying a linkage flow in the linkage process of the second embodiment. An example is explained in which a user inputs the function execution request for "scan+projection" in the operation terminal 200.

Figure 7:
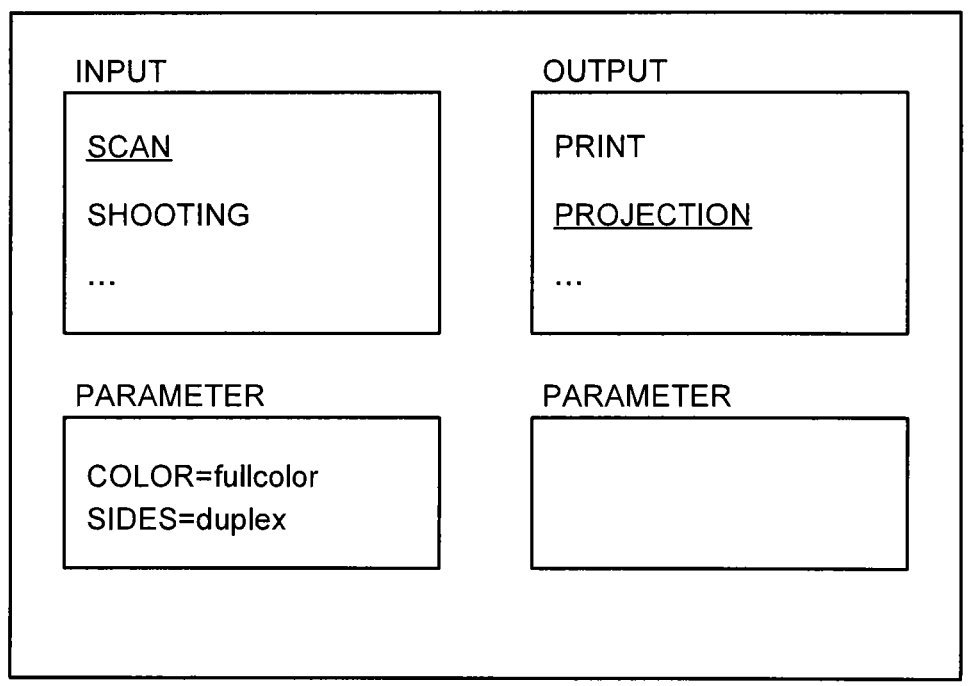
FIG. 7 is a schematic diagram illustrating an example of an input screen for a function execution request in the second embodiment.

FIG. 7 is a schematic diagram illustrating an example of an input screen for a function execution request in the second embodiment. The UI unit 101 of the information processing apparatus 500 displays the input screen illustrated in FIG. 7 on the operation terminal 200, and a user inputs an execution request for a desired function via the input screen. As illustrated in FIG. 7, the user specifies a desired input function and a parameter of the input function. The user also specifies a desired output function and a parameter of the output function.

Referring back to FIG. 6, the operation terminal 200 transmits the function execution request for "scan+projection", which is specified by the user via the input screen, to the information processing apparatus 500 (Step S31).

The UI unit 101 of the information processing apparatus 500 receives the function execution request and sends, to the flow execution application 503, a flow generation request containing an input function (scan), an output function (projection), and a parameter (e.g., an input attribute, such as monochrome/color, or a projection attribute), as designated in the function execution request (Step S32). The flow execution application 503 sends a flow generation request to the service linkage unit 511 by using the API (Step S33).

When receiving the flow generation request from the flow execution application 503, the service linkage unit 511 instructs the device searching unit 512 to send a specifications-information acquisition request to the peripheral input devices and output devices, i.e., the MFP #1, the projector #1, and the projector #2, connected to the network (Steps S34, S36, and S38), and acquires the specifications information from each of the devices (Steps S35, S37, and S39).

The service linkage unit 511 compares the specifications information acquired by the device searching unit 512 and generates a linkage flow indicating an execution sequence and a combination of an input device and an output device that can execute the input function and the output function designated in the function execution request (Step S40).

The specifications information of the MFP #1 is denoted by 601 in FIG. 6, the specifications information of the projector #1 is denoted by 602 in FIG. 6, and the specifications information of the projector #2 is denoted by 603 in FIG. 6. FIG. 8 illustrates a comparative table of the specifications information of the MFP #1, the projector #1, and the projector #2.

In the example illustrated in FIG. 6 and FIG. 8, the flow generation request indicates "scan+projection", and the MFP #1 can execute "scan" and the projector #1 and the projector #2 can execute "projection". The output format for the scan performed by the MFP #1 is JPEG and the input format for the projection performed by the projector #1 is JPEG. Therefore, the service linkage unit 511 generates a linkage flow "the MFP #1 to the projector #1". Here, the input format for the projection performed by the projector #2 is TIFF; therefore, the projector #2 is eliminated from a candidate for linkage. If there are a plurality of combinations that enable linkage, a plurality of linkage flows are generated.

As denoted by 604, the linkage flow contains a designated function call (Scan( )) for the input function, provided with the IP address of the input device (the MFP #1), a scan attribute (designation of color/monochrome [fullcolor], an output data format [JPEG], and a comment on the input device (the MFP #1) as parameters, and contains a designated function call (Projection( )) for the output function provided with the IP address of the output device (the projector #1), a projection attribute, and a comment on the output device (the projector #1) as parameters, in an execution sequence.

In the present embodiment, the function (Scan( )) for the input function and the function (Projection( )) for the output function provided by the API are written in the linkage flow together with the parameters.

The service linkage unit 511 sends the generated linkage flow to the flow execution application 503 (Step S41). The flow execution application 503 sends the linkage flow to the UI unit 101 (Step S42), and the UI unit 101 displays the linkage flow on the operation terminal 200 used by the user (Step S43).

Figure 9:
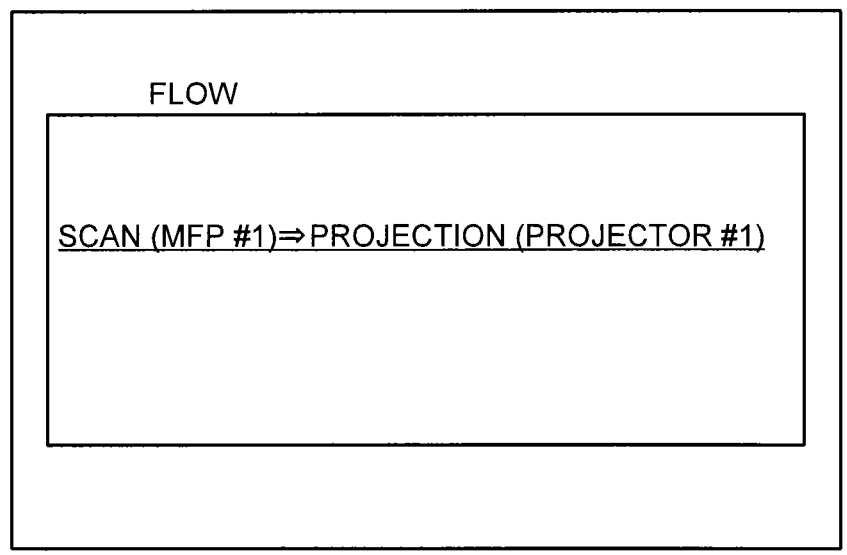
FIG. 9 is a schematic diagram illustrating an example of a flow selection screen that is displayed on an operation terminal by a UI unit.

FIG. 9 is a schematic diagram illustrating an example of a flow selection screen that is displayed on the operation terminal 200 by the UI unit 101. In the example in FIG. 6, one linkage flow is generated; therefore, only the one linkage flow is displayed on the flow selection screen. However, if the service linkage unit 511 generates a plurality of linkage flows, the generated linkage flows are displayed on the flow selection screen.

Figure 10:
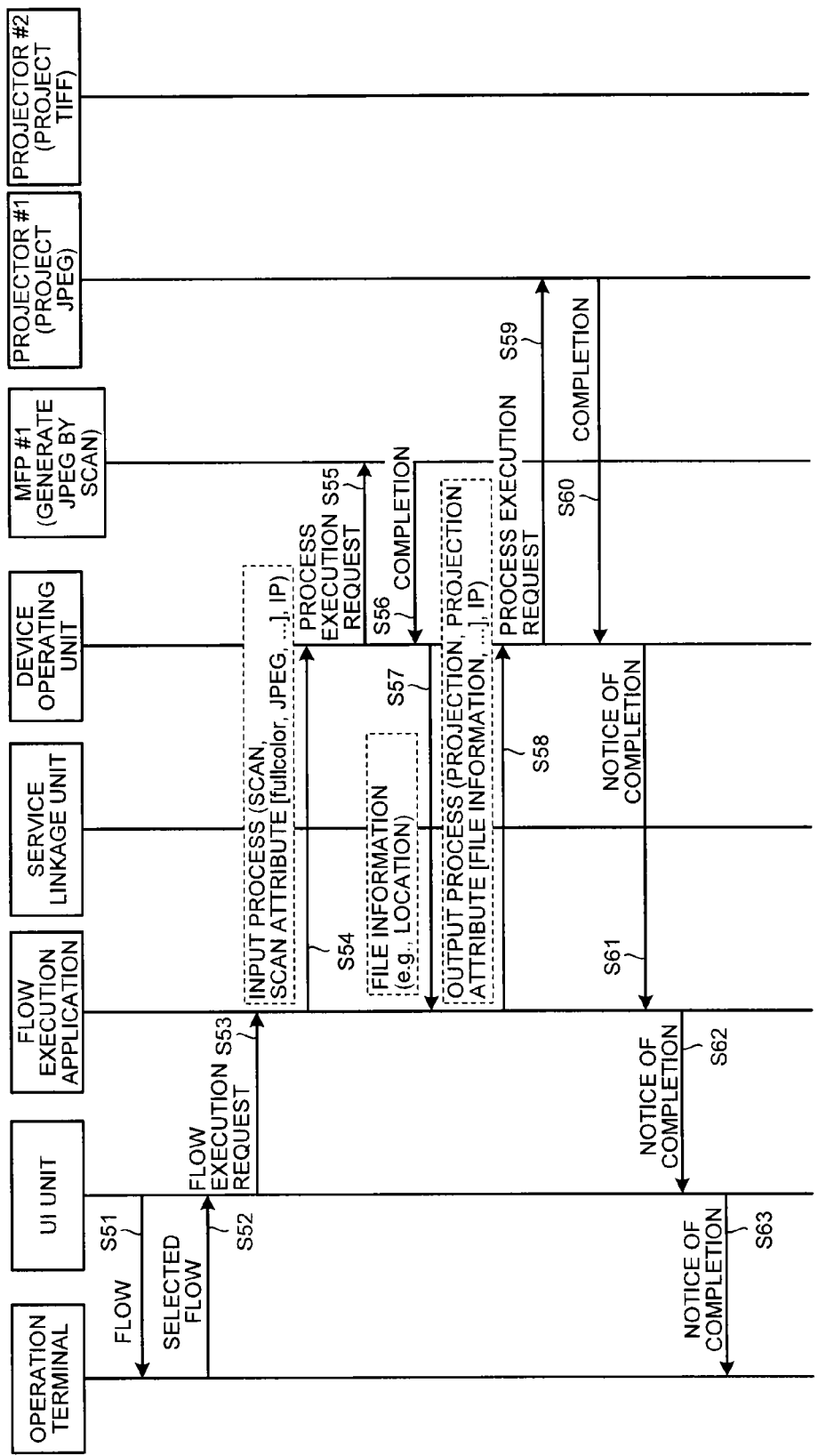
FIG. 10 is a sequence diagram from a process of selecting a linkage flow to a process of executing processes by an input device and an output device in the linkage process of the second embodiment.

FIG. 10 is a sequence diagram from a process of selecting a linkage flow to a process of executing processes by an input device and an output device in the linkage process of the second embodiment. When a user selects a desired linkage flow from the linkage flow selection screen illustrated in FIG. 9 via the operation terminal 200 (Step S51), the operation terminal 200 receives the selection and sends the selection to the UI unit 101 of the information processing apparatus 500 (Step S52).

The UI unit 101 sends an execution request for the selected linkage flow to the flow execution application 503 (Step S53).

The flow execution application 503 calls a function designated in the selected linkage flow by using the API. Therefore, it becomes possible to enable linkage between the MFP #1 and the projector #1 without regard to a change in the parameters for a process of causing the MFP #1 and the projector #1 to link each other.

Specifically, the flow execution application 503 calls the function (Scan( )) for the input function with the specified parameters by referring to the received linkage flow, and sends a request for an input process to the device operating unit 104 by using the API (Step S54). The request for the input process contains the input function indicating scan, parameters for a designation of color/monochrome (fullcolor) and the output data format (JPEG), and the IP address of the input device (the MFP #1).

When receiving the request for the input process, the device operating unit 104 sends a process execution request to the input device (the MFP #1) designated in the request for the input process (Step S55). When receiving a notice of completion of the process from the input device (the MFP #1) (Step S56), the device operating unit 104 stores the notice of completion and the received scanned image data in the storage unit 105. The device operating unit 104 then sends file information indicating a location of the scanned image data to the flow execution application 103 (Step S57).

When receiving the file information, the flow execution application 503 calls the function (Projection( )) of the output function registered in the linkage flow by specifying the file information as a parameter, and sends a request for an output process to the device operating unit 104 by using the API (Step S58). The request for the output process contains projection as the output function, a parameter such as the file information, and the IP address of the output device (the projector #1).

When receiving the request for the output process, the device operating unit 104 sends a process execution request to the output device (the projector #1) designated in the request for the output process (Step S59). When receiving a notice of completion of the process from the output device (the projector #1) (Step S60), the device operating unit 104 sends the notice of completion to the flow execution application 503 (Step S61). The notice of completion is sent from the flow execution application 503 to the UI unit 101 and is subsequently sent from the UI unit 101 to the operation terminal 200 (Steps S62 and S63).

As described above, according to the present embodiment, when a function execution request relating to input and output is received from a user without a designation of an input device and an output device, the device searching unit 512 acquires specifications information from input devices and output devices connected to the network, the service linkage unit 511 generates a linkage flow containing a combination of an input device and an output device that can link each other and an execution sequence based on the specifications information, and the flow execution application 503 sends a process execution request to the input device and the output device in accordance with the linkage flow. Therefore, even when a user does not know presence or absence of the input device and the output device or the specifications of the input device and the output device, it is possible to enable linkage between the input device and the output device to perform a desired input/output process. It is also possible to easily cause the input device and the output device to link each other.

Furthermore, according to the present embodiment, the flow execution application 503 sends the flow generation request to the service linkage unit 511 by using the API and sends execution requests for the input process and the output process to the device operating unit 104 by using the API. Therefore, it is possible to easily enable linkage between the input device and the output device without regard to a change in the parameters for a process of causing the input device and the output device to link each other.

Third Embodiment

In the first and the second embodiments, the specifications information is acquired from the input device and the output device every time the flow generation request is issued in accordance with the function execution request sent from a user. In a third embodiment, the specifications information acquired from the input device and the output device are stored, and when a next flow generation request is issued, the stored specifications information is used to generate a linkage flow.

Figure 11:
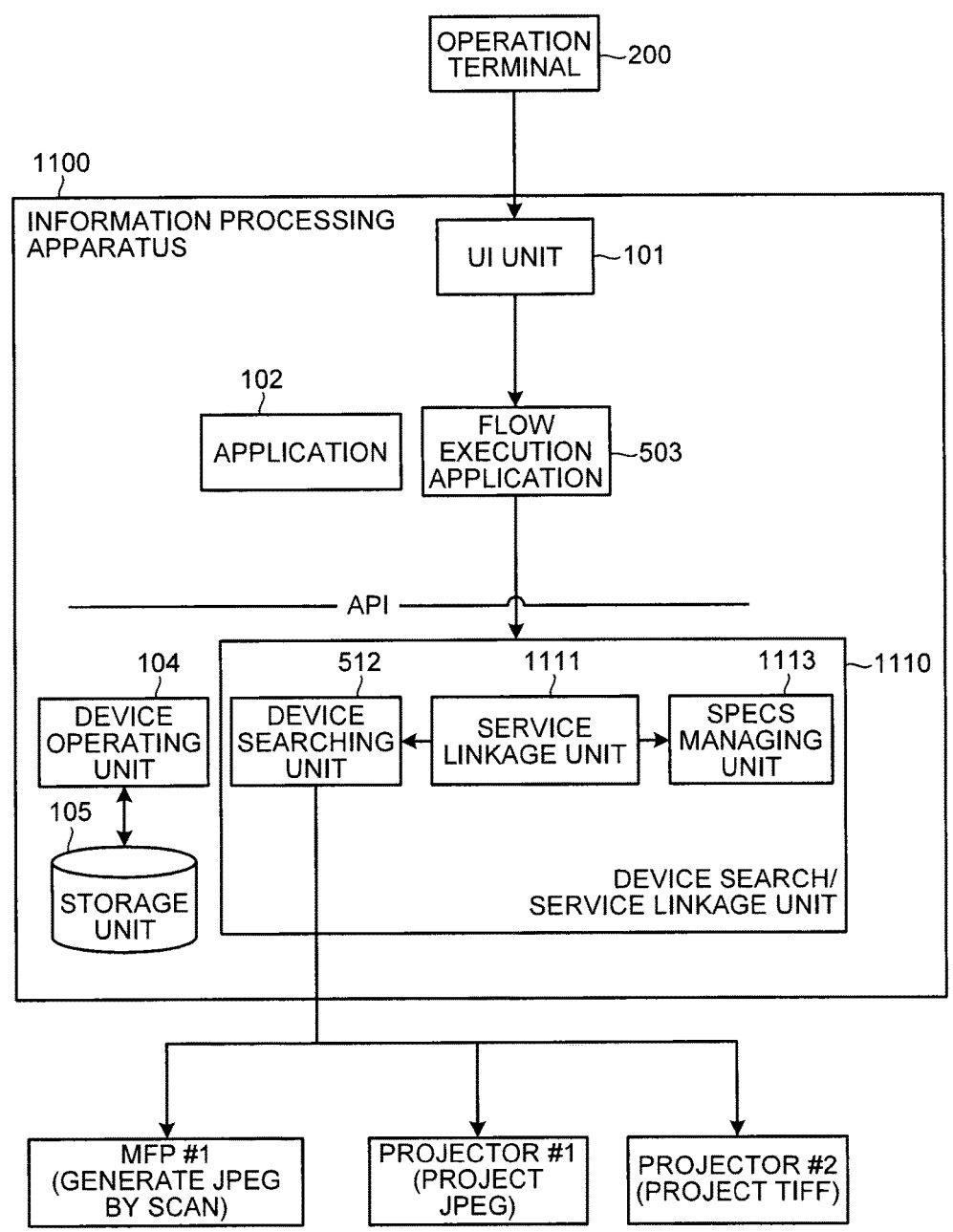
FIG. 11 is a block diagram of a network configuration of an information processing system and a functional configuration of an information processing apparatus of a third embodiment.

FIG. 11 is a block diagram of a network configuration of an information processing system and a functional configuration of an information processing apparatus of the third embodiment. As illustrated in FIG. 11, the information processing system of the present embodiment includes an information processing apparatus 1100, the operation terminal 200, and a plurality of input devices and output devices including the MFP #1, the projector #1, and the projector #2, which are connected to one another via a network, such as the Internet or a LAN.

The operation terminal 200, the MFP #1, the projector #1, and the projector #2 have the same functions as described in the second embodiment. The specifications of the MFP #1, the projector #1, and the projector #2 are the same as those of the MFP #1, the projector #1, and the projector #2 of the second embodiment, respectively.

As illustrated in FIG. 11, the information processing apparatus 1100 includes the UI unit 101, the flow execution application 503, and the application 102 in an upper layer above the API. The information processing apparatus 1100 mainly includes a device search/service linkage unit 1110, the device operating unit 104, and the storage unit 105 in a lower layer below the API.

The UI unit 101, the flow execution application 503, the device operating unit 104, and the storage unit 105 have the same functions and configurations as described in the second embodiment.

In the present embodiment, similarly to the second embodiment, the UI unit 101 receives a function execution request that contains designations of a desired input function and a desired output function but does not contain designations of an input device that executes the input function and an output device that executes the output function.

The device search/service linkage unit 1110 mainly includes a service linkage unit 1111, the device searching unit 512, and a specifications managing unit 1113. The device searching unit 512 has the same function and configuration as described in the second embodiment.

The specifications managing unit 1113 is a storage medium, such as a hard disk drive (HDD) or a flash memory, for storing specifications information received by the device searching unit 512.

The service linkage unit 1111 stores the specifications information received by the device searching unit 512 in the specifications managing unit 1113. The service linkage unit 1111 generates a linkage flow with designations of an input device and an output device that can link each other in accordance with the function execution request input by the user, on the basis of the specifications information received by the device searching unit 512 or the specifications information stored in the specifications managing unit 1113.

Specifically, when the specifications information is registered in the specifications managing unit 1113, the service linkage unit 1111 generates a linkage flow based on the specifications information stored in the specifications managing unit 1113. On the other hand, when the specifications information is not registered in the specifications managing unit 1113 or when the specifications information stored in the specifications managing unit 1113 does not match a current specifications of an input device or an output device, the service linkage unit 1111 causes the device searching unit 512 to acquire the specifications information of the input device and the output device and generates a linkage flow based on the specifications information received by the device searching unit 512. Details of the method for generating the linkage flow are the same as described in the second embodiment.

Figure 12:
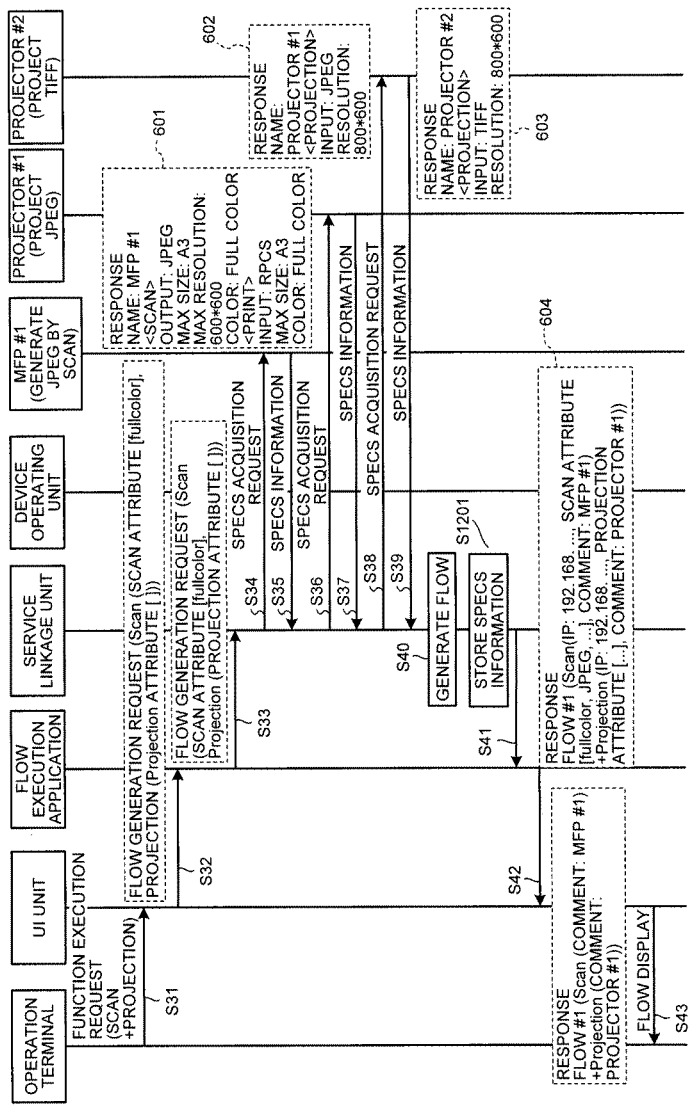
FIG. 12 is a sequence diagram from a process of requesting execution of functions to a process of displaying a linkage flow in a linkage process of a third embodiment.

A concrete example of a device linkage process of the present embodiment with the above configuration will be explained below. FIG. 12 is a sequence diagram from a process of requesting execution of functions to a process of displaying a linkage flow in a linkage process of the third embodiment. An example is explained in which a user inputs a function execution request for "scan+projection" in the operation terminal 200.

The processes from inputting the function execution request in the operation terminal 200 by a user to acquiring specifications information from the MFP #1, the projector #1, and the projector #2 and generating a flow (Steps S31 to S40) are the same as described in the second embodiment.

When acquiring the specifications information and generating the flow, the service linkage unit 1111 stores the acquired specifications information in the specifications managing unit 1113 (Step S1201). The specifications information is stored in the specifications managing unit 1113 in the format as illustrated in FIG. 8.

The service linkage unit 1111 generates a linkage flow in the same manner as described in the second embodiment, based on the acquired specifications information (Step S40). Subsequently, the generated linkage flow is displayed on the operation terminal 200 in the same manner as described in the second embodiment (Steps S41 to S43).

Figure 13:
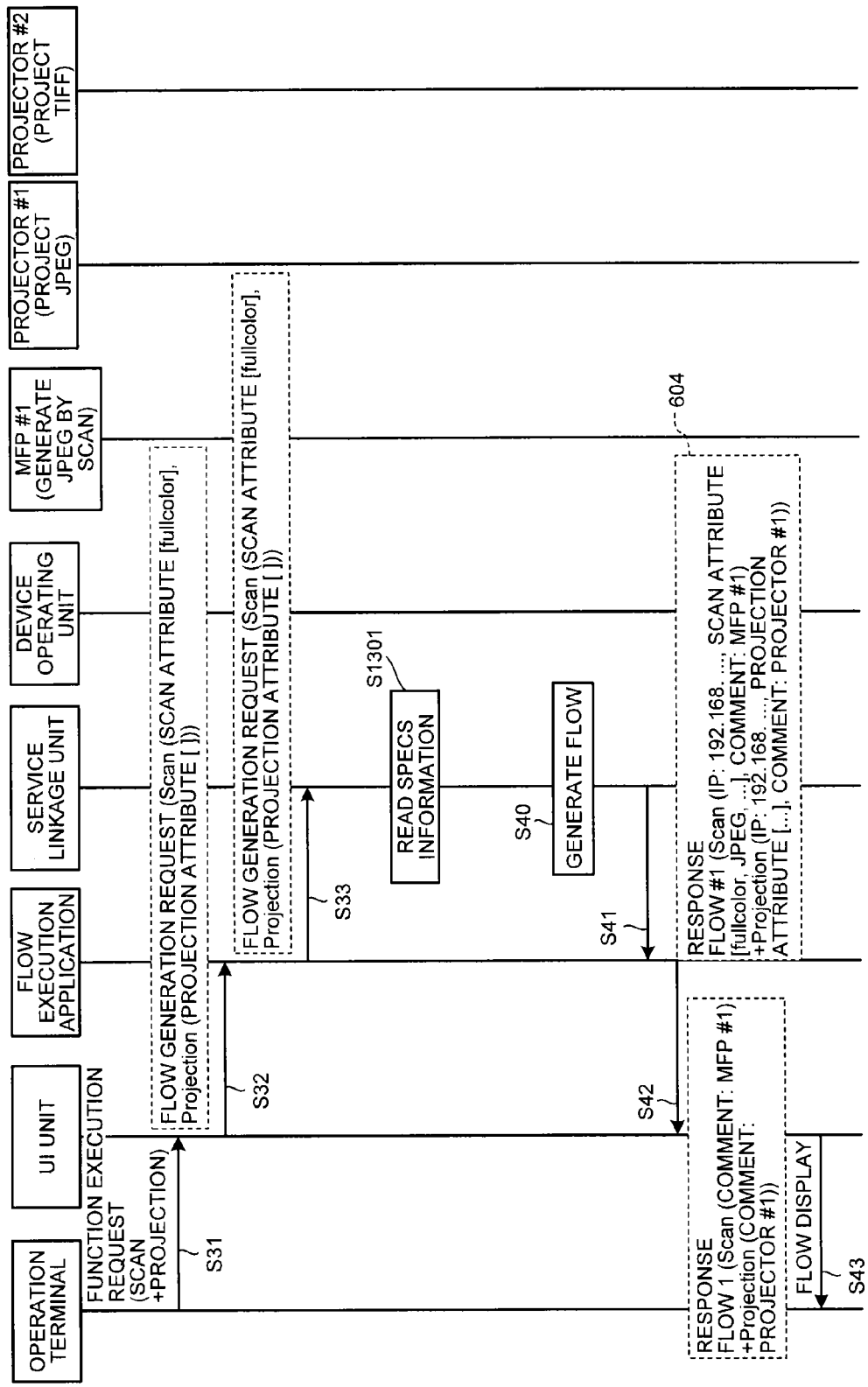
FIG. 13 is a sequence diagram from a process of requesting execution of functions to a process of displaying a linkage flow using specifications information stored in a specifications managing unit in a linkage process of the third embodiment.

The specifications information stored in the specifications managing unit 1113 can be used in the following manner. FIG. 13 is a sequence diagram from a process of requesting execution of functions to a process of displaying a linkage flow using the specifications information stored in the specifications managing unit 1113 in the linkage process of the third embodiment.

The processes from inputting the function execution request in the operation terminal 200 by a user to requesting flow generation by the flow execution application 503 (Steps S31 to S33) are the same as described in the second embodiment.

When receiving the flow generation request from the flow execution application 503, the service linkage unit 1111 reads the specifications information of the input device and the output device from the specifications managing unit 1113 instead of causing the device searching unit 512 to request the input device and the output device to provide the specifications information (Step S1301). The service linkage unit 1111 generates a linkage flow in the same manner as described in the second embodiment, based on the read specifications information (Step S40). Subsequently, the generated linkage flow is displayed on the operation terminal 200 in the same manner as described in the second embodiment (Steps S41 to S43).

As described above, according to the present embodiment, the specifications information acquired by the device searching unit 512 is stored in the specifications managing unit 1113 and the specifications information stored in the specifications managing unit 1113 is used to generate a linkage flow in a next flow generation process. Therefore, it is possible to speed up the linkage process performed by the input device and the output device.

Fourth Embodiment

In the first to the third embodiments, the input device and the output device are caused to link each other. By contrast, in a fourth embodiment, a service on a cloud computer (hereinafter, referred to as a "cloud service") can link an input device and an output device.

Furthermore, in the first to the third embodiments, the device operating unit 104 recognizes actual usage of the input device and the output device. When a cloud service is provided as an original product manufactured by the same provider as that of the information processing apparatus, the device operating unit 104 also recognizes the usage of the cloud service. However, if a cloud service provided by a third vendor rather than the original product is to be connected, because the number of cloud services provided by third vendors is rapidly increasing, it may be difficult to continuously install a processing section to establish a connection to the cloud services of the third vendors onto the information processing apparatus.

Therefore, in the fourth embodiment, a custom application developed by a third vendor is installable on the API so that a connection to a cloud service provided by a third vendor can be established by the custom application.

Figure 14:
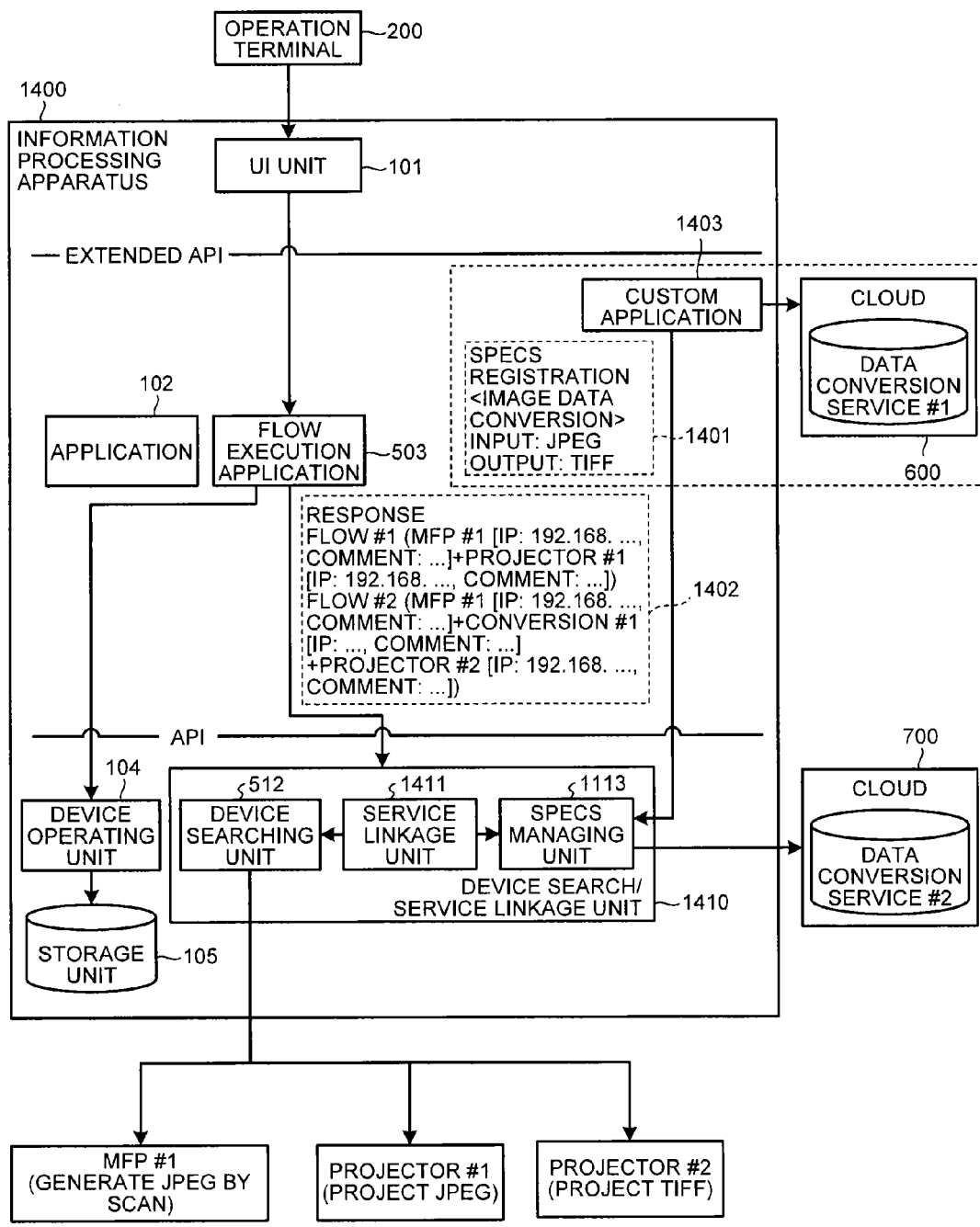
FIG. 14 is a block diagram of a network configuration of an information processing system and a functional configuration of an information processing apparatus of a fourth embodiment.

FIG. 14 is a block diagram of a network configuration of an information processing system and a functional configuration of an information processing apparatus of the fourth embodiment. As illustrated in FIG. 14, the information processing system of the present embodiment includes an information processing apparatus 1400, the operation terminal 200, and a plurality of input devices and output devices including the MFP #1, the projector #1, and the projector #2, which are connected to one another via a network, such as the Internet or a LAN. The information processing apparatus 1400 is connectable to a cloud service 700 including a data conversion service #2 provided by the same manufacturer as that of the information processing apparatus 1400 and is also connectable to a cloud service 600 including a data conversion service #1 provided by a third vendor, via a network such as the Internet.

The operation terminal 200, the MFP #1, the projector #1, and the projector #2 have the same functions as described in the second embodiment. The specifications of the MFP #1, the projector #1, and the projector #2 are the same as those of the MFP #1, the projector #1, and the projector #2 of the second embodiment, respectively.

As illustrated in FIG. 14, the information processing apparatus 1400 includes the UI unit 101, the flow execution application 503, the application 102, and a custom application 1403 in an upper layer above the API. The information processing apparatus 1400 mainly includes a device search/service linkage unit 1410, the device operating unit 104, and the storage unit 105 in a lower layer below the API.

The UI unit 101, the flow execution application 503, the device operating unit 104, and the storage unit 105 have the same functions and configurations as described in the second embodiment.

In the present embodiment, similarly to the second embodiment, the UI unit 101 receives a function execution request that contains designations of a desired input function and a desired output function but does not contain designations of an input device that executes the input function and an output device that executes the output function.

A flow generation request sent from the flow execution application 503 to a service linkage unit 1411 contains "conversion #1" indicating data conversion performed by the data conversion service #1 as denoted by 1402.

The custom application 1403 is an application for establishing a connection to the data conversion service #1 that is a cloud service provided by a third vendor and that is not recognizable by the information processing apparatus 1400. The custom application 1403 recognizes the way to connect to the data conversion service (conversion #1). Therefore, in FIG. 14, the custom application 1403 and the cloud service 600 enclosed by a dashed line are provided by the third vendor.

The custom application 1403 provides an interface for a "processing process" (as concretely described in the second embodiment) defined by the API in order to provide functions of the data conversion service #1. The API for the processing process is also used when the data conversion service #2 that is the original cloud service is used.

The device search/service linkage unit 1410 mainly includes the service linkage unit 1411, the device searching unit 512, and the specifications managing unit 1113. The device searching unit 512 and the specifications managing unit 1113 have the same functions and configurations as described in the third embodiment.

In the present embodiment, the device searching unit 512 does not know an interface corresponding to the data conversion service #1 provided by the third vendor; therefore, the device searching unit 512 cannot request the data conversion service #1 to provide specifications information. Therefore, the API provides a function of "registration of specifications information" to access the specifications managing unit 1113 as described in the second embodiment. Accordingly, the custom application 1403 calls the specifications registration function to use the API and stores the specifications information of the data conversion service #1 in the specifications managing unit 1113. An example of the specifications information of the data conversion service #1 is denoted by 1401.

The service linkage unit 1411 stores the specifications information of the cloud service 700, which is the original service, in the specifications managing unit 1113. The service linkage unit 1411 has the same functions as described in the third embodiment.

As described above, in the present embodiment, it is possible to install the custom application developed by a third vendor onto the API. Therefore, it becomes possible to easily link cloud services as well as with an input device and an output device.

Fifth Embodiment

In a fifth embodiment, combinations of an input device and an output device that can link each other are displayed on an operation terminal to allow a user to determine a combination, instead of causing a service linkage unit to generate a linkage flow. That is, in the present embodiment, the linkage flow is configured based on a designation of a user.

The information processing apparatus 1400 of the present embodiment has the same configuration as described in the fourth embodiment illustrated in FIG. 14.

The service linkage unit 1411 of the present embodiment generates a list of one or more input devices that have an input function designated in the function execution request and a list of one or more output devices that have an output function designated in the function execution request, instead of generating a linkage flow.

The UI unit 101 displays the list of one or more input devices and the list of one or more output devices on the operation terminal 200, and receives a selection of one input device from the list of one or more input devices and one output device from the list of one or more output devices, from a user.

The flow execution application 503 generates a linkage flow based on the selected input device and the selected output device, and sends a process request to each of the selected input device and the selected output device in accordance with the linkage flow.

When the input device and the output device that are selected by the user cannot link each other, the UI unit 101 selects a processing process performed by a data conversion service etc., which is connected to the network and which processes data output from the input device into data corresponding to the specifications information of the output device.

In this case, the flow execution application 503 generates a linkage flow containing the selected input device, the selected processing process, and the selected output device, and sends a process request to each of the devices and the service.

Figures 15, 16:
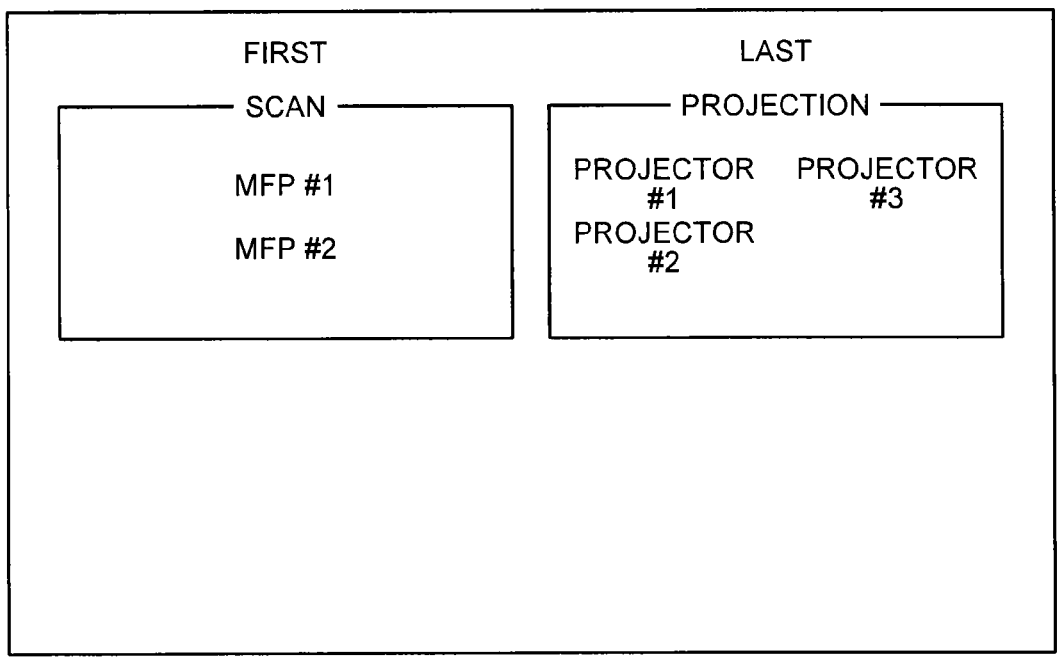
FIG. 15 is a diagram illustrating a response from a service linkage unit of a fifth embodiment.
FIG. 16 is a diagram illustrating a flow selection screen of the fifth embodiment.
Figure 17:
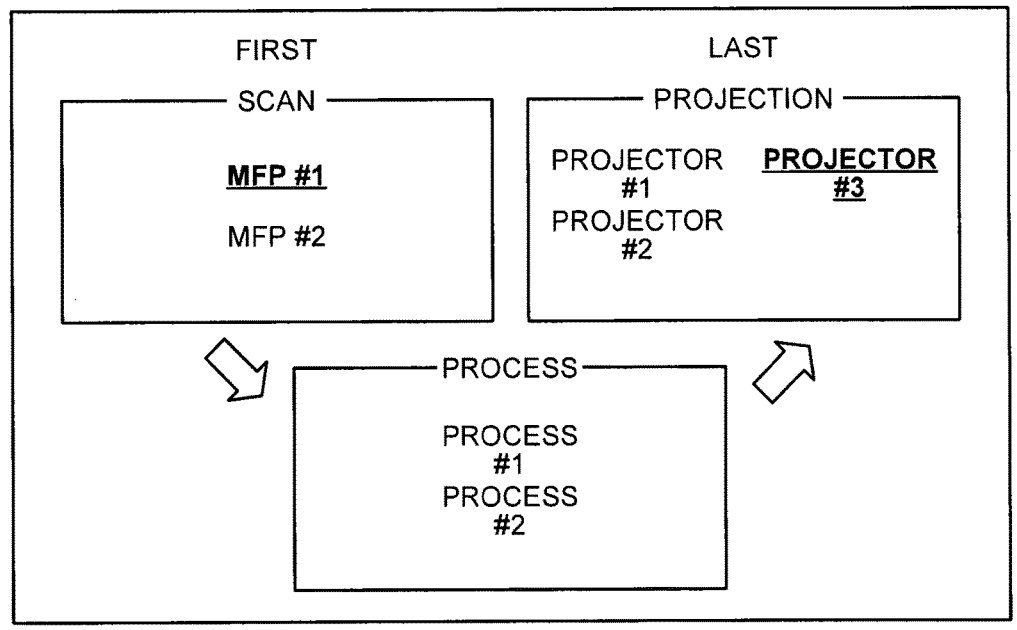
FIG. 17 is a diagram illustrating another flow selection screen of the fifth embodiment.

For example, when the service linkage unit 1411 receives a flow generation request for "scan +projection" from the flow execution application 503, the service linkage unit 1411 generates a response as illustrated in FIG. 15 and sends the response to the flow execution application 503.

As illustrated in FIG. 15, the response contains names of devices and services, corresponding input/output formats, and corresponding input/output functions, where "FIRST" indicates an input function of the designated linkage flow (in this example, "scan") and "LAST" indicates an output function in the designated linkage flow (in this example, "projection").

When the flow execution application 503 receives the response illustrated in FIG. 15, the UI unit 101 displays a flow selection screen illustrated in FIG. 16 on the operation terminal 200.

A user can select an input device and an output device via the flow selection screen. For example, when the MFP #1 and the projector #1 are selected, because the output of the MFP #1 is JPEG and the input of the projector #1 is JPEG as illustrated in the response in FIG. 15, the flow execution application 503 configures a linkage flow for "scan+projection" and executes the flow.

However, if the MFP #1 and a projector #3 are selected via the flow selection screen, because the input of the projector #3 is PDF in the response illustrated in FIG. 15, linkage is impossible without any modification.

Therefore, the flow execution application 503 of the present embodiment displays, on the flow selection screen, a process #1 and a process #2 that enable conversion between JPEG used for the output of the MFP #1 and PDF used for the input of the projector #3 (i.e., an input is JPEG and an output if PDF), as a process needed to establish a connection, and allows a user to select one of the processes.

In this case, when the user selects the process #1, the flow execution application 503 configures and executes a linkage flow formed of the MFP #1→[JPEG]→the process #1→[PDF]→the projector #3.

As another example, it is possible to allow a user to select devices and services in order from the input device side. In this case, the data structure of a response that is sent from the service linkage unit 1411 to the flow execution application 503 is configured as follows.

MFP #1=>[process #1, process #2]
MFP #2=>[process #2, process #3]
process #1=>[projector #1]
process #2=>[projector #1, projector #2]
process #3=>[projector #2, projector #3]

Figure 18:
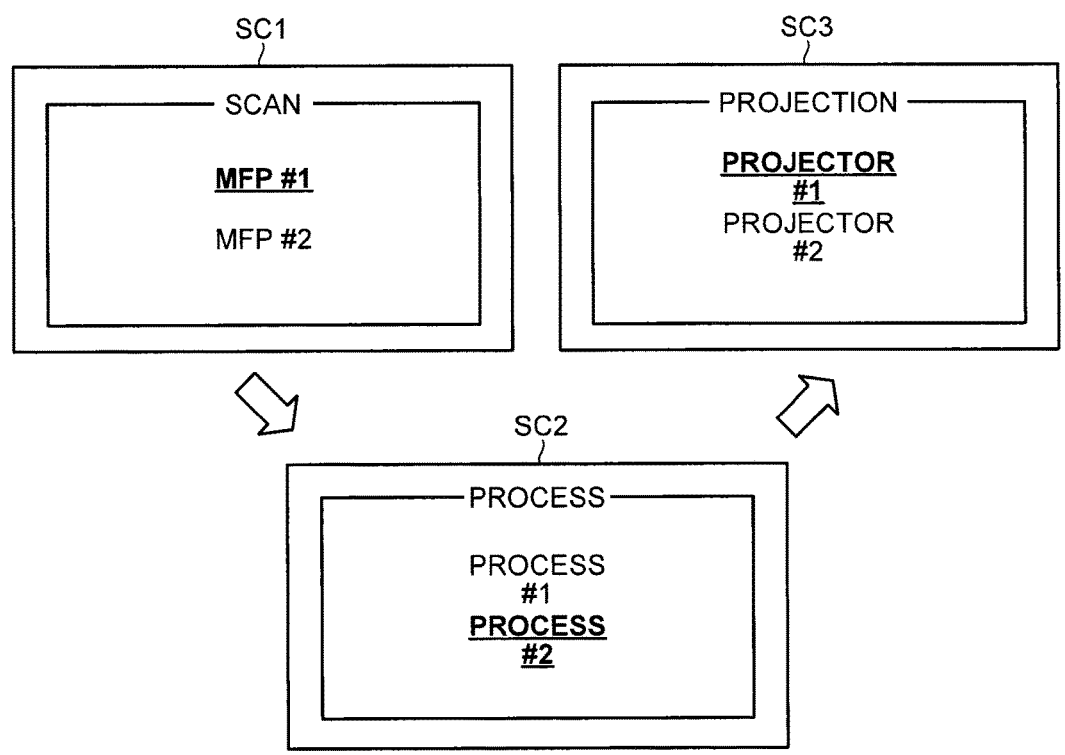
FIG. 18 is a diagram illustrating transition between flow selection screens of the fifth embodiment.

FIG. 18 is a diagram illustrating transition between flow selection screens. The UI unit 101 first displays a screen for selecting the MFP #1 or an MFP #2 as the input device, and thereafter displays a screen for selecting the process #1 or the process #2 and a screen for selecting the projector #1 or the projector #2 in sequence on the operation terminal 200, in accordance with each selection by the user. The flow execution application 503 generates a linkage flow based on the selected devices.

As described above, according to the present embodiment, devices and services that link one another are determined based on a selection by a user. Therefore, it is possible to increase the flexibility of the linkage.

Sixth Embodiment

In a sixth embodiment, the specifications information of the cloud service described in the fourth embodiment contains a processing time taken by the cloud service.

Figure 19:
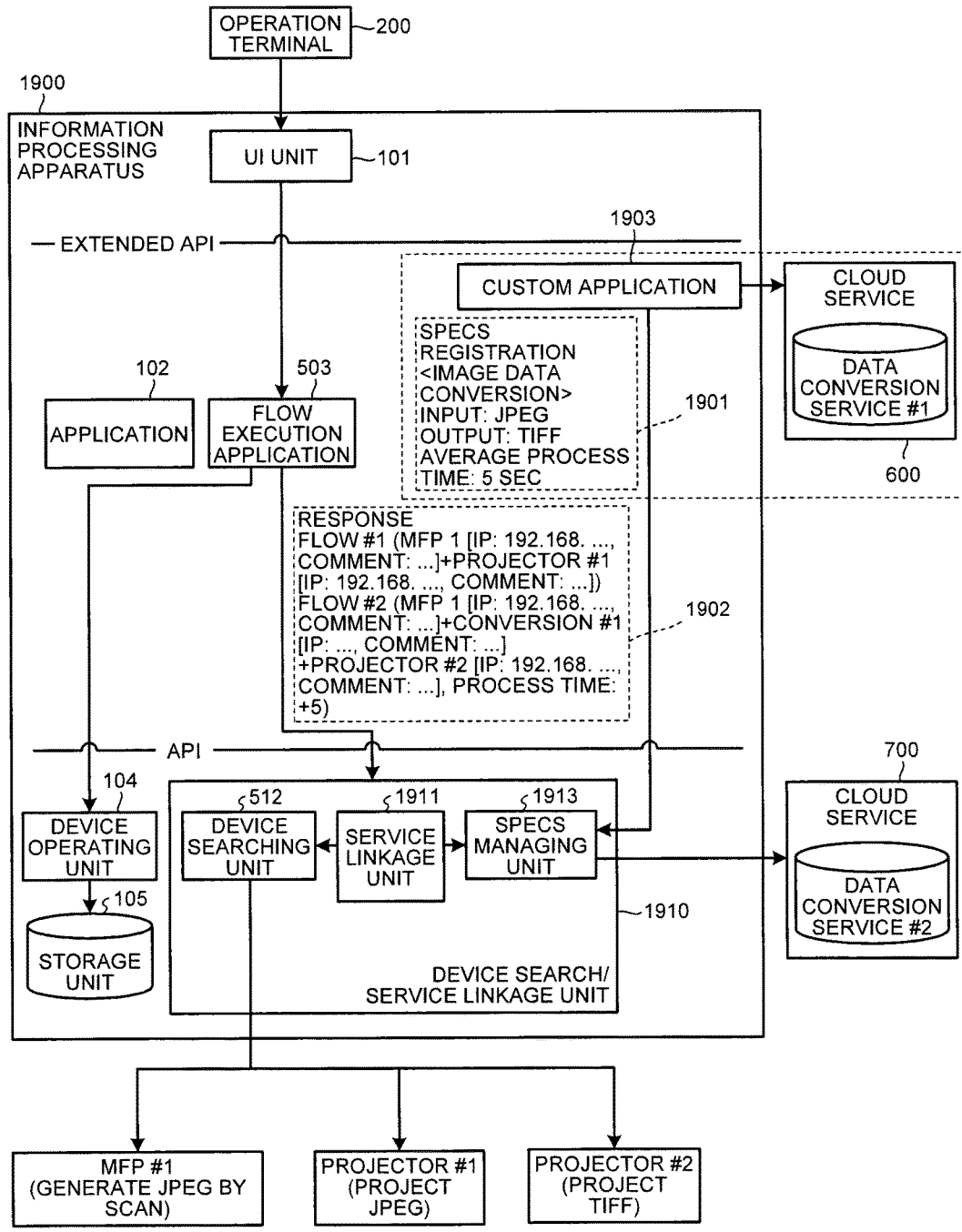
FIG. 19 is a block diagram of a network configuration of an information processing system and a functional configuration of an information processing apparatus of a sixth embodiment.

FIG. 19 is a block diagram of a network configuration of an information processing system and a functional configuration of an information processing apparatus of the sixth embodiment. As illustrated in FIG. 19, the information processing system of the present embodiment includes an information processing apparatus 1900, the operation terminal 200, and a plurality of input devices and output devices including the MFP #1, the projector #1, and the projector #2, which are connected to one another via a network, such as the Internet or a LAN. The information processing apparatus 1900 is connectable to the cloud service 700 including the data conversion service #2 provided by the same manufacturer as that of the information processing apparatus 1900 and is also connectable to the cloud service 600 including the data conversion service #1 provided by a third vendor, via a network such as the Internet.

The operation terminal 200, the MFP #1, the projector #1, the projector #2, the cloud service 600, and the cloud service 700 have the same functions as described in the fourth embodiment.

As illustrated in FIG. 19, the information processing apparatus 1900 includes the UI unit 101, the flow execution application 503, the application 102, and a custom application 1903 in an upper layer above the API. The information processing apparatus 1900 mainly includes a device search/service linkage unit 1910, the device operating unit 104, and the storage unit 105 in a lower layer below the API.

The UI unit 101, the flow execution application 503, the device operating unit 104, the storage unit 105, and the application 102 have the same functions and configurations as described in the second embodiment.

The custom application 1903 of the present embodiment registers, in the specifications information of the data conversion service #1, an average processing time taken by the data conversion service #1 in addition to the contents of the specifications information described in the fourth embodiment, and thereafter stores the specifications information in a specifications managing unit 1913 by using the API. An example of the specifications information of the present embodiment is denoted by 1901.

As illustrated in FIG. 19, the device search/service linkage unit 1910 mainly includes a service linkage unit 1911, the device searching unit 512, and the specifications managing unit 1913. The device searching unit 512 and the specifications managing unit 1913 have the same functions and configurations as described in the fourth embodiment.

When generating a linkage flow using the data conversion service #1, the service linkage unit 1911 causes the custom application 1903 to extract an average processing time from the specifications information stored in the specifications managing unit 1913 and generates a linkage flow containing "conversion #1", which indicates data conversion performed by the data conversion service #1 similarly to the fourth embodiment, and the average processing time. An example of the linkage flow is denoted by 1902, in which the processing time is registered. In this example, it is indicated that the processing time of the linkage flow containing the data conversion service #1 performed by the cloud service 600 becomes 5 seconds longer than the processing time of the linkage flow that does not contain the data conversion service #1.

It may be possible to add the above information to the specifications information that is sent as a response to an inquiry when the device searching unit 512 searches for an input device and an output device. Furthermore, the linkage flow may contain a reference time taken to a series of processes performed in accordance with the linkage flow.

As described above, according to the present embodiment, a linkage flow contains a processing time. Therefore, when a plurality of linkage flows are displayed, a user can determine a linkage flow in consideration of a processing time in addition to the consideration of the device and the service as factors used to select a linkage flow.

Seventh Embodiment

In a seventh embodiment, a function execution request from a user contains positional information of the operation terminal 200, and a device is searched for by using the positional information.

Figure 20:
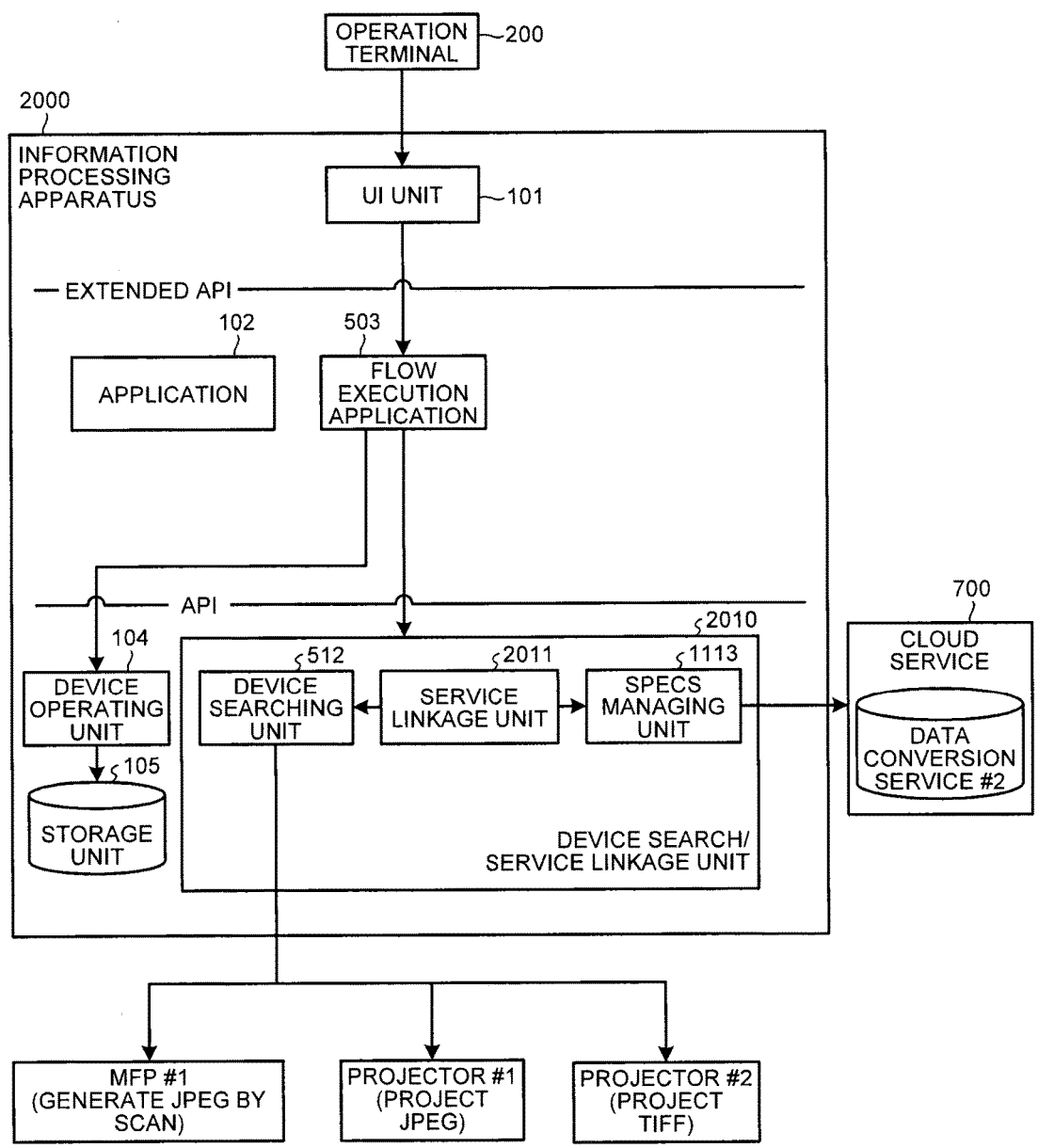
FIG. 20 is a block diagram of a network configuration of an information processing system and a functional configuration of an information processing apparatus of a seventh embodiment.

FIG. 20 is a block diagram of a network configuration of an information processing system and a functional configuration of an information processing apparatus of the seventh embodiment. As illustrated in FIG. 20, the information processing system of the present embodiment includes an information processing apparatus 2000, the operation terminal 200, and a plurality of input devices and output devices including the MFP #1, the projector #1, and the projector #2, which are connected to one another via a network, such as the Internet or a LAN. The information processing apparatus 2000 is connectable to the cloud service 700 including the data conversion service #2 provided by the same manufacturer as that of the information processing apparatus 2000 via a network such as the Internet.

The operation terminal 200, the MFP #1, the projector #1, the projector #2, and the cloud service 700 have the same functions as described in the fourth embodiment.

As illustrated in FIG. 20, the information processing apparatus 2000 includes the UI unit 101, the flow execution application 503, and the application 102 in an upper layer above the API. The information processing apparatus 2000 mainly includes a device search/service linkage unit 2010, the device operating unit 104, and the storage unit 105 in a lower layer below the API.

The UI unit 101, the device operating unit 104, the storage unit 105, and the application 102 have the same functions and configurations as described in the second embodiment.

In the present embodiment, the UI unit 101 receives a function execution request that contains a desired input function, a desired output function, and positional information of the operation terminal 200 but does not contain designations of an input device that executes the input function and an output device that executes the output function, from the operation terminal 200. Examples of the positional information include, but not limited to, a position coordinate based on the latitude and the altitude acquired by a GPS or the like.

The flow execution application 503 sends, to a service linkage unit 2011, a flow generation request with designations of the input function, the output function, and the positional information contained in the function execution request. Therefore, the positional information can be specified as a parameter in each of functions provided by the API of the present embodiment.

As illustrated in FIG. 20, the device search/service linkage unit 2010 mainly includes the service linkage unit 2011, the device searching unit 512, and the specifications managing unit 1113. The device searching unit 512 and the specifications managing unit 1113 have the same functions and configurations as described in the fourth embodiment.

However, the specifications managing unit 1113 also stores the positional information of the input device and the output device contained in the specifications information.

The positional information may be acquired by the device searching unit 512 as a part of the specifications information or may be registered in advance by an administrator or the like.

The specifications information that is received by the device searching unit 512 in response to a request for the specifications information contains the positional information of each of the devices.

The service linkage unit 2011 extracts a combination of an input device and an output device that can link each other and that have positional information within a predetermined range with respect to the positional information of the operation terminal, and generates a linkage flow based on the extracted combination.

Figure 21:
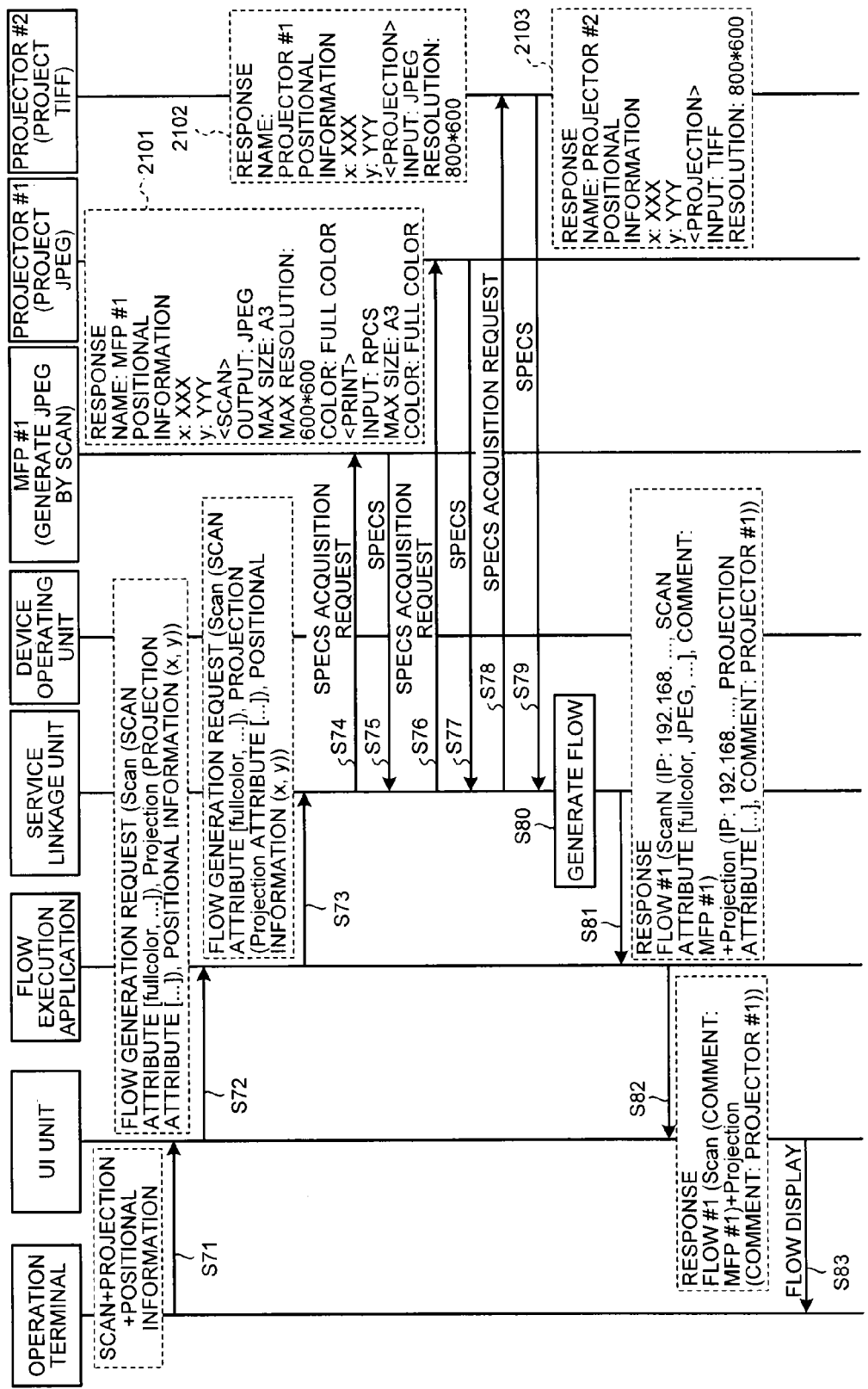
FIG. 21 is a sequence diagram from a process of requesting execution of functions to a process of displaying a linkage flow in a linkage process of the seventh embodiment.

A concrete example of a device linkage process of the present embodiment with the above configuration will be explained below. FIG. 21 is a sequence diagram from a process of requesting execution of functions to a process of displaying a linkage flow in the linkage process of the seventh embodiment. An example is explained in which a user inputs a function execution request for "scan+projection+positional information" in the operation terminal 200.

The operation terminal 200 transmits the function execution request for "scan+projection+positional information" designated by a user to the information processing apparatus 2000 (Step S71).

The UI unit 101 of the information processing apparatus 2000 receives the function execution request, sends a flow generation request containing an input function (scan), an output function (projection), a parameter (e.g., an input attribute, such as monochrome/color, or a projection attribute), and positional information as designated in the function execution request to the flow execution application 503 (Step S72). The flow execution application 503 sends the flow generation request to the service linkage unit 2011 by using the API (Step S73).

When receiving the flow generation request from the flow execution application 503, the service linkage unit 2011 gives an instruction to the device searching unit 512, and the device searching unit 512 sends a specifications-information acquisition request to the MFP #1, the projector #1, and the projector #2, which are the peripheral input devices and output devices connected to the network (Steps S74, S76, and S78), and then acquires the specifications information from each of the devices (Steps S75, S77, and S79). The specifications information contains the positional information of each of the devices (see 2101, 2102, and 2103 in the figure).

The service linkage unit 2011 compares the specifications information acquired by the device searching unit 512, obtains combinations of an input device and an output device that can realize the input function and the output function designated in the function execution request, selects a combination of an input device and an output device that have positional information within a predetermined range with respect to the operation terminal 200, and generates a linkage flow indicating an execution sequence (Step S80). The subsequent processes (Steps S81 to S83) are the same processes (Steps S41 to S43) as described in the second embodiment.

As described above, according to the present embodiment, the positional information of the operation terminal 200 is specified in the function execution request, and when the service linkage unit 2011 generates a linkage flow, the service linkage unit 2011 extracts a combination of an input device and an output device that have positional information within a predetermined range with respect to the positional information of the operation terminal 200. Therefore, a user can designate the input device and the output device that link each other to execute input/output functions near the operation terminal 200, so that the user can obtain a desired result at an earlier time.

Modification

In the seventh embodiment, the device searching unit 512 acquires the specifications information of the input device and the output device, and when the service linkage unit 2011 generates a linkage flow, the service linkage unit 2011 extracts a combination of devices that have positional information within a predetermined range with respect to the positional information of the operation terminal 200. By contrast, if the positional information of the input device and the output device is already known, and when the device searching unit 512 sends a specifications-information acquisition request, the device searching unit 512 may select an input device and an output device that have positional information within the predetermined range with respect to the positional information of the operation terminal 200 and send a specifications-information acquisition request to the selected devices.

Figure 22:
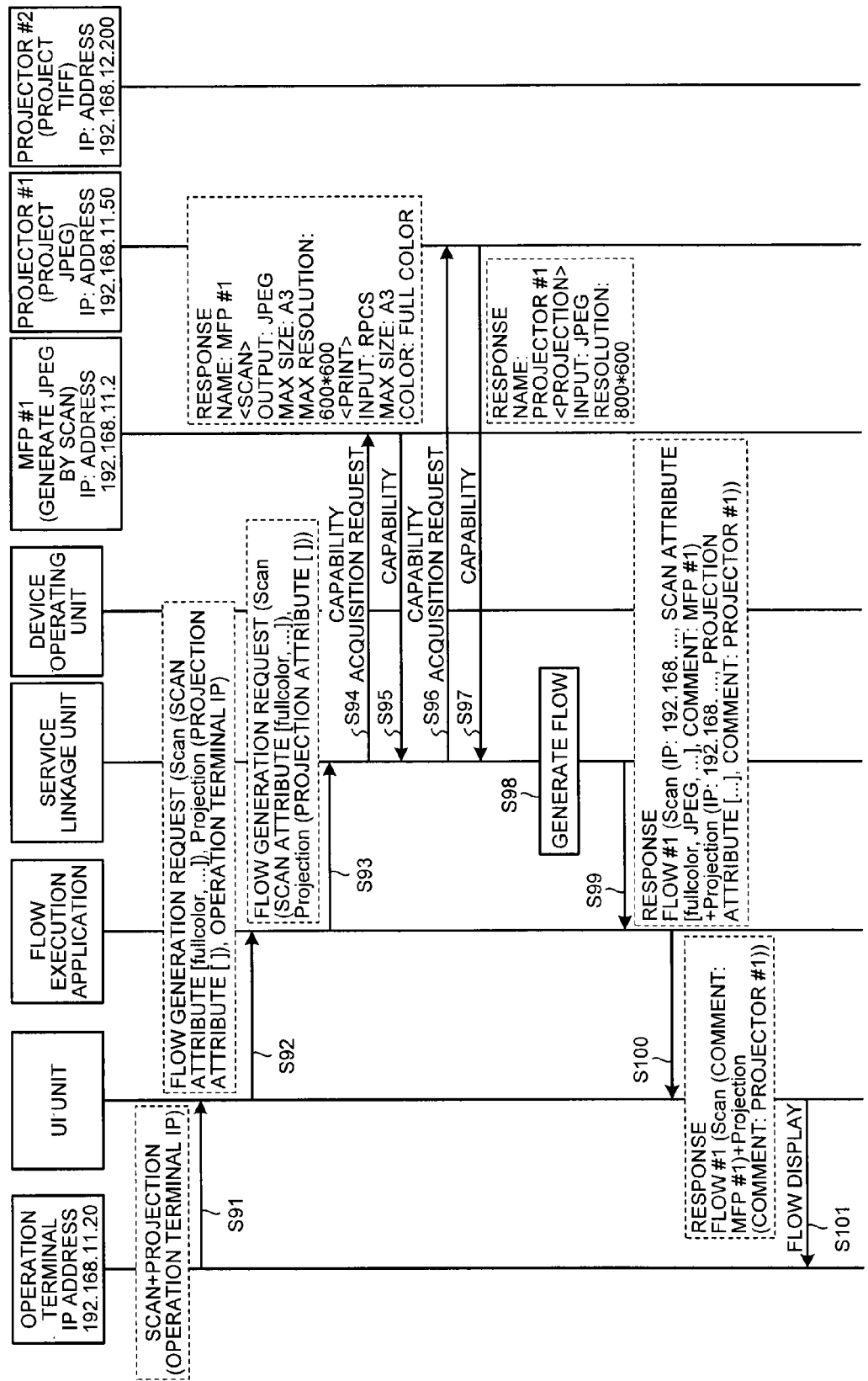
FIG. 22 is a sequence diagram from a process of requesting execution of functions to a process of displaying a linkage flow in a linkage process of a modification of the seventh embodiment.

FIG. 22 is a sequence diagram from a process of requesting execution of functions to a process of displaying a linkage flow in a linkage process of the modification of the seventh embodiment. In this example, the IP address is used as the positional information and the IP addresses of the input device and the output device are registered in advance in the specifications managing unit 1113. Furthermore, a user inputs a function execution request for "scan+projection+the IP address of an operation terminal" in the operation terminal 200.

The operation terminal 200 sends the function execution request for "scan+projection+IP address of an operation terminal" designated by a user to the information processing apparatus 2000 (Step S91).

The UI unit 101 of the information processing apparatus 2000 receives the function execution request and sends, to the flow execution application 503, a flow generation request containing an input function (scan), an output function (projection), a parameter (e.g., an input attribute, such as monochrome/color, or a projection attribute), and the IP address of the operation terminal, as designated in the function execution request (Step S92). The flow execution application 503 sends a flow generation request to the service linkage unit 2011 by using the API (Step S93).

When receiving the flow generation request from the flow execution application 503, the service linkage unit 2011 gives an instruction to the device searching unit 512, and the device searching unit 512 refers to the specifications managing unit 1113 to select a device having the IP address that satisfies a certain condition (e.g., within the same segment or within a predetermined range) with respect to the IP address of the operation terminal designated in the flow generation request, from among the MFP #1, the projector #1, and the projector #2 that are the peripheral input devices and output devices connected to the network. Thereafter, the device searching unit 512 sends a specifications-information acquisition request to the selected device.

In the present example, the device searching unit 512 selects input devices and output devices with IP addresses of "192.168.11.*". Specifically, the device searching unit 512 selects the MFP #1 with an IP address of "192.168.11.2" and the projector #1 with an IP address of "192.168.11.50", sends the specifications-information acquisition request to each of the MFP #1 and the projector #1 (Steps S94 and S96), and acquires the specifications information from each of the MFP #1 and the projector #1 (Steps S95 and S97).

The projector #2 is not selected and the specifications-information acquisition request is not sent to the projector #2 because the IP address thereof is "192.168.12.200".

Subsequently, the service linkage unit 2011 generates a linkage flow based on the acquired specifications information in the same manner as described in the second embodiment (Step S98), and the subsequent processes (Steps S99 to S101) are performed in the same processes (Steps S41 to S43) as described in the second embodiment.

As described above, according to the present embodiment, when the device searching unit 512 sends the specifications information acquisition request, the device searching unit 512 selects an input device and an output device that have positional information within a predetermined range with respect to the positional information of the operation terminal 200, sends the specifications-information acquisition request to the selected devices, and generates a linkage flow based on the selected devices. Therefore, it is possible to achieve the same advantages as those of the seventh embodiment as well as to reduce network loads.

Eighth Embodiment

In an eighth embodiment, when a user carrying an operation terminal enters a meeting room and directly connects the operation terminal to a device, such as a projector, installed in the meeting room, the operation terminal acquires the ID of the device and sends a function execution request to an information processing apparatus with a designation of the ID to cause the device to execute an input function and an output function.

Figure 23:
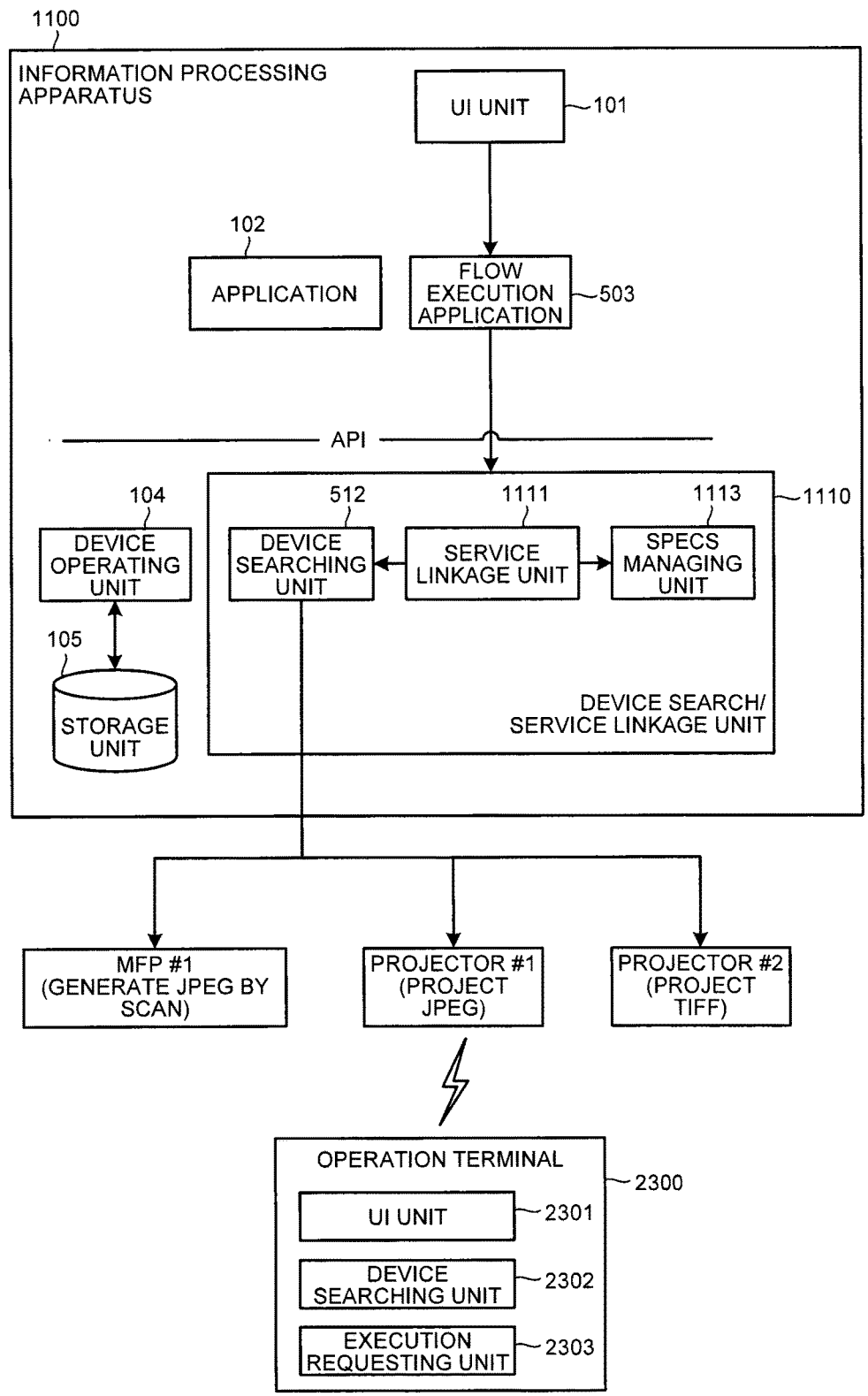
FIG. 23 is a block diagram of a network configuration and a functional configuration of an information processing apparatus of an eighth embodiment.

FIG. 23 is a block diagram of a network configuration of the eighth embodiment and a functional configuration of an information processing apparatus of the eighth embodiment. As illustrated in FIG. 23, the information processing system of the present embodiment includes the information processing apparatus 1100, an operation terminal 2300, and an input/output device such as the MFP #1, the projector #1, or the projector #2. The information processing apparatus 1100 of the present embodiment has the same configuration and the function as described in the third embodiment.

The operation terminal 2300 is a terminal that the user can carry. Examples of the operation terminal 2300 include, but not limited to, a mobile device including a smartphone and a mobile phone; and a tablet. As illustrated in FIG. 23, the operation terminal 2300 includes a UI unit 2301, a device searching unit 2302, and an execution requesting unit 2303.

The UI unit 2301 displays thereon various screens for the user and receives various operations from the user.

The device searching unit 2302 searches for an input/output device, such as the MFP #1, the projector #1, or the projector #2, within the network, and establishes an ad-hoc network connection to the input/output device obtained by the search. The UI unit 2301 requests the input/output device, which has established the ad-hoc network connection, to provide an ID as identification information for identifying the device, and receives the ID.

The execution requesting unit 2303 sends a function execution request with a designation of the ID to the information processing apparatus 1100.

When receiving the request for the ID from the operation terminal 2300, the input/output device, such as the MFP #1, the projector #1, or the projector #2, sends own ID to the operation terminal 2300.

When receiving the function execution request from the operation terminal 2300, the information processing apparatus 1100 causes the input/output device to execute a function by the same processes as described in the third embodiment.

Figure 24:
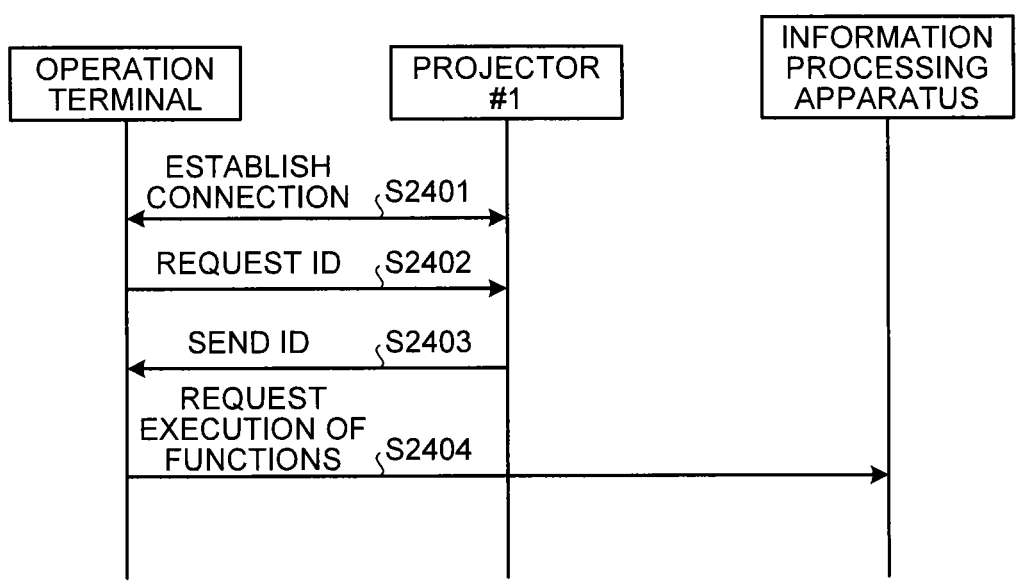
FIG. 24 is a sequence diagram of a function execution process of the eighth embodiment.

A function execution process performed by the information processing system configured as above in the present embodiment will be explained below. FIG. 24 is a sequence diagram of the function execution process according to the eighth embodiment. In the example in FIG. 24, a case is explained that the projector #1 is used as the input/output device; however, the same process is performed when other device is used as the input/output device.

The device searching unit 2302 of the operation terminal 2300 searches for a device within a network, and establishes an ad-hoc network connection to the projector #1 (Step S2401). Subsequently, the device searching unit 2302 of the operation terminal 2300 requests the projector #1 that has established the ad-hoc network connection to provide the IP of the projector #1 (Step S2402).

When receiving the request for the ID, the projector #1 sends own ID to the operation terminal 2300 (Step S2403).

When receiving the ID of the projector #1, the operation terminal 2300 sends a function execution request with a designation of the ID to the information processing apparatus 1100 (Step S2404). Therefore, the information processing apparatus 1100 that has received the function execution request causes the projector #1 to perform projection in the same manner as described in the third embodiment.

As described above, according to the present embodiment, the operation terminal 2300 establishes an ad-hoc network connection to the projector #1 to acquire an ID, and sends a function execution request with a designation of the ID to the information processing apparatus 1100. Therefore, even when a user who has entered a meeting room wants to use the projector #1 installed in the meeting room without knowing the IP address of the projector #1, it is possible to cause the projector #1 to project a desired image or document, which is convenient for the user.

Ninth Embodiment

In a ninth embodiment, when a user carrying an operation terminal enters a meeting room and directly connects the operation terminal to a device, such as a projector, installed in the meeting room, the operation terminal directly causes the device to execute an input function and an output function.

Figure 25:
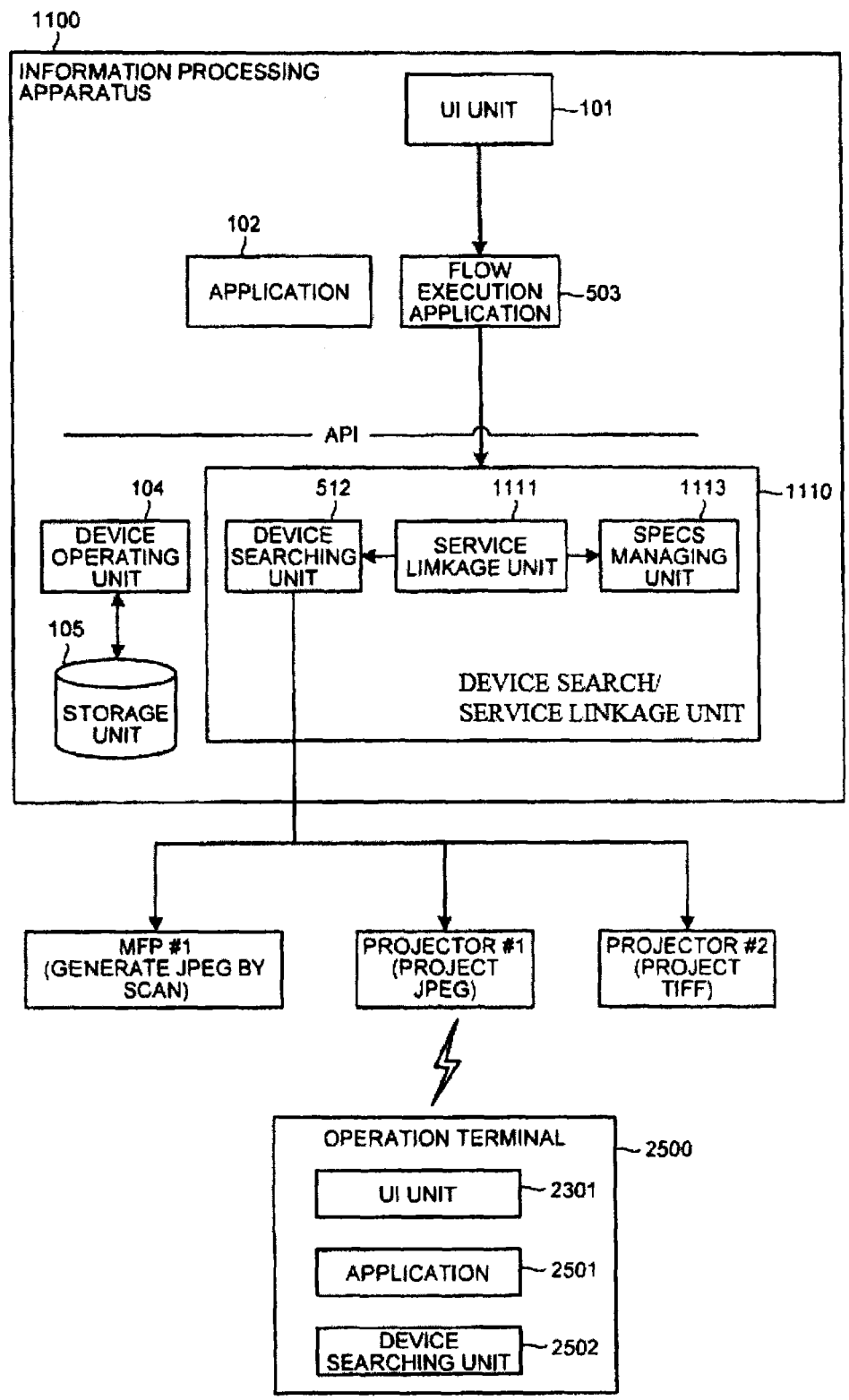
FIG. 25 is a block diagram of a network configuration and a functional configuration of an information processing apparatus of a ninth embodiment.

FIG. 25 is a block diagram of a network configuration of the ninth embodiment and a functional configuration of an information processing apparatus of the ninth embodiment. As illustrated in FIG. 25, the information processing system of the present embodiment includes the information processing apparatus 1100, an operation terminal 2500, and an input/output device such as the MFP #1, the projector #1, or the projector #2. The information processing apparatus 1100 has the same configuration and function as described in the third embodiment.

The operation terminal 2500 is a terminal that the user can carry. Examples of the operation terminal 2500 include, but not limited to, a mobile device including a smartphone and a mobile phone; and a tablet. As illustrated in FIG. 25, the operation terminal 2300 includes the UI unit 2301, a device searching unit 2502, and an application 2501. The UI unit 2301 has the same function as described in the eighth embodiment.

The device searching unit 2502 searches for an input/output device, such as the MFP #1, the projector #1, or the projector #2, within the network and establishes an ad-hoc network connection to the input/output device obtained by the search, in the same manner as described in the eighth embodiment. The device searching unit 2502 of the present embodiment receives a command to execute a function in the input/output device from the input/output device that has established the ad-hoc network connection. The command contains a uniform resource identifier (URI) of the input/output device.

The application 2501 issues, a command containing the URI to the input/output device, such as the MFP #1, the projector #1, or the projector #2.

When receiving a request for the command from the device searching unit 2502 of the operation terminal 2500, the input/output device, such as the MFP #1, the projector #1, or the projector #2, sends the command containing the URI to the operation terminal 2500. When the application 2501 of the operation terminal 2500 issues the command, the input/output device executes functions.

Figure 26:
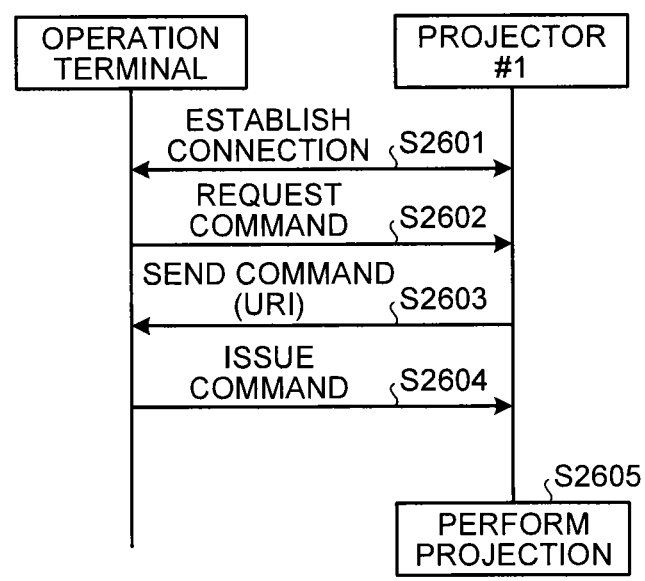
FIG. 26 is a sequence diagram of a function execution process of the ninth embodiment.

A function execution process performed by the information processing system of the present embodiment with the above configuration will be explained below. FIG. 26 is a sequence diagram of the function execution process of the ninth embodiment. In the example in FIG. 26, a case is explained that the projector #1 is used as the input/output device; however, the same process is performed when other device is used as the input/output device.

The device searching unit 2502 of the operation terminal 2500 searches for a device within the network and establishes an ad-hoc network connection with the projector #1 (Step S2601). The device searching unit 2502 of the operation terminal 2500 requests the projector #1 that has established the ad-hoc network connection to provide a command containing a URI to execute a projection function of the projector #1 (Step S2602).

When receiving the request for the command, the projector #1 sends the command containing the URI to execute the projection function (Step S2603).

When receiving the command from the projector #1, the operation terminal 2500 issues a command with a designation of the URI to the projector #1 (Step S2604). Therefore, the projector #1 performs a projection process (Step S2605).

As described above, according to the present embodiment, the operation terminal 2500 establishes an ad-hoc network connection to the projector #1, acquires a command to execute a function, and issues the command to cause the projector #1 to execute the projection function. Therefore, even when a user who has entered a meeting room wants to use the projector #1 installed in the meeting room without knowing the IP address of the projector #1, it is possible to cause the projector #1 to project a desired image or document, which is convenient for the user.

Tenth Embodiment

Figure 27:
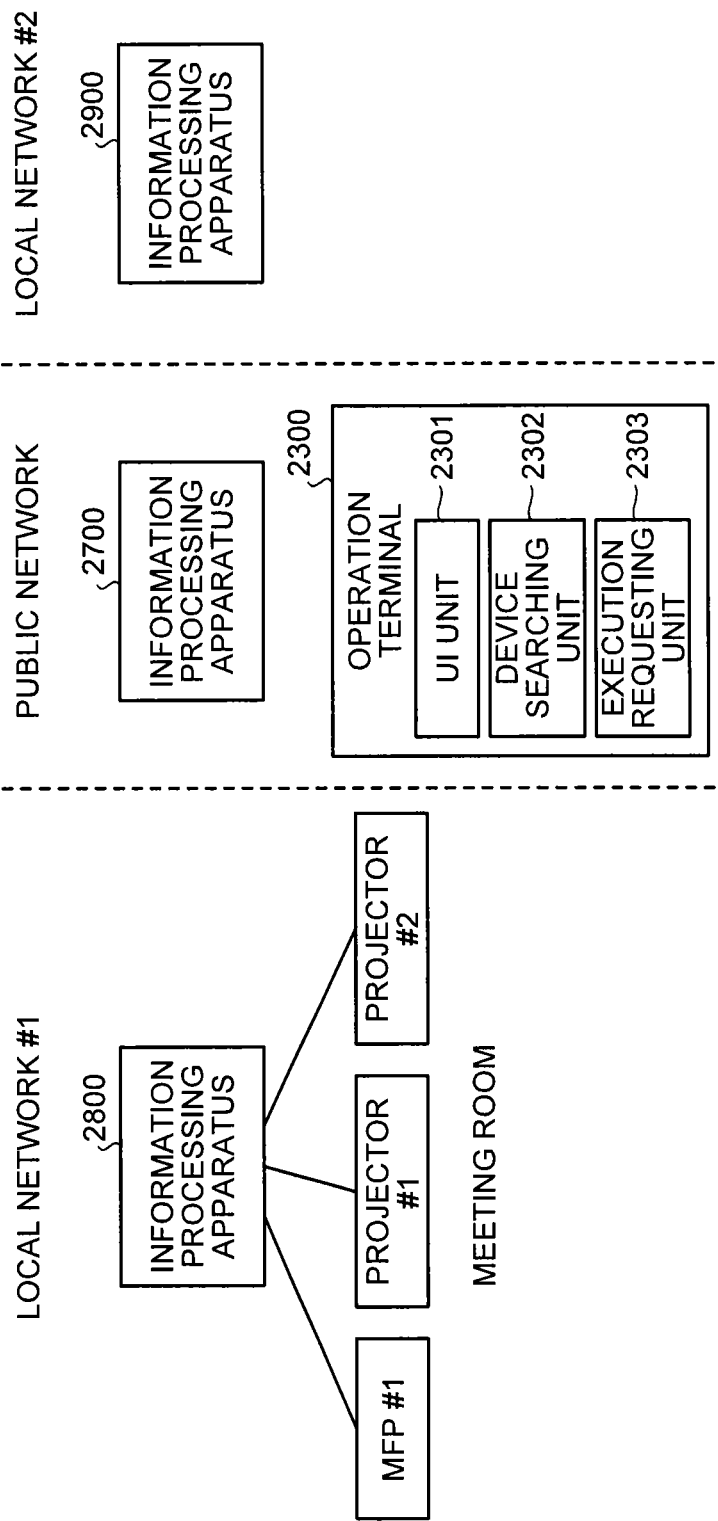
FIG. 27 is a network configuration diagram according to a tenth embodiment.

FIG. 27 is a network configuration diagram of a tenth embodiment. As illustrated in FIG. 27, an information processing system of the present embodiment includes three information processing apparatuses 2700, 2800, and 2900 and input/output devices, such as the MFP #1, the projector #1, and the projector #2.

As illustrated in FIG. 27, the information processing apparatus 2800 and the input/output devices, such as the MFP #1, the projector #1, and the projector #2, are connected to one another in a local network #1 (first network). The information processing apparatus 2700 is located in a public network (second network). The information processing apparatus 2900 is located in a local network #2 (third network).

The information processing apparatus 2800 and the information processing apparatus 2700 are accessible to each other, and the information processing apparatus 2900 and the information processing apparatus 2700 are accessible to each other. The information processing apparatus 2800 and the input/output devices, such as the MFP #1, the projector #1, and the projector #2, are installed in a meeting room and connected to the local network 1. A user carrying the operation terminal 2300 enters the meeting room and uses the input/output devices in the meeting room. In the present embodiment, to use the input/output devices in the meeting room via the operation terminal 2300, the operation terminal 2300 connects to the information processing apparatus 2700 in the public network. A detailed explanation will be given below.

Figure 28:
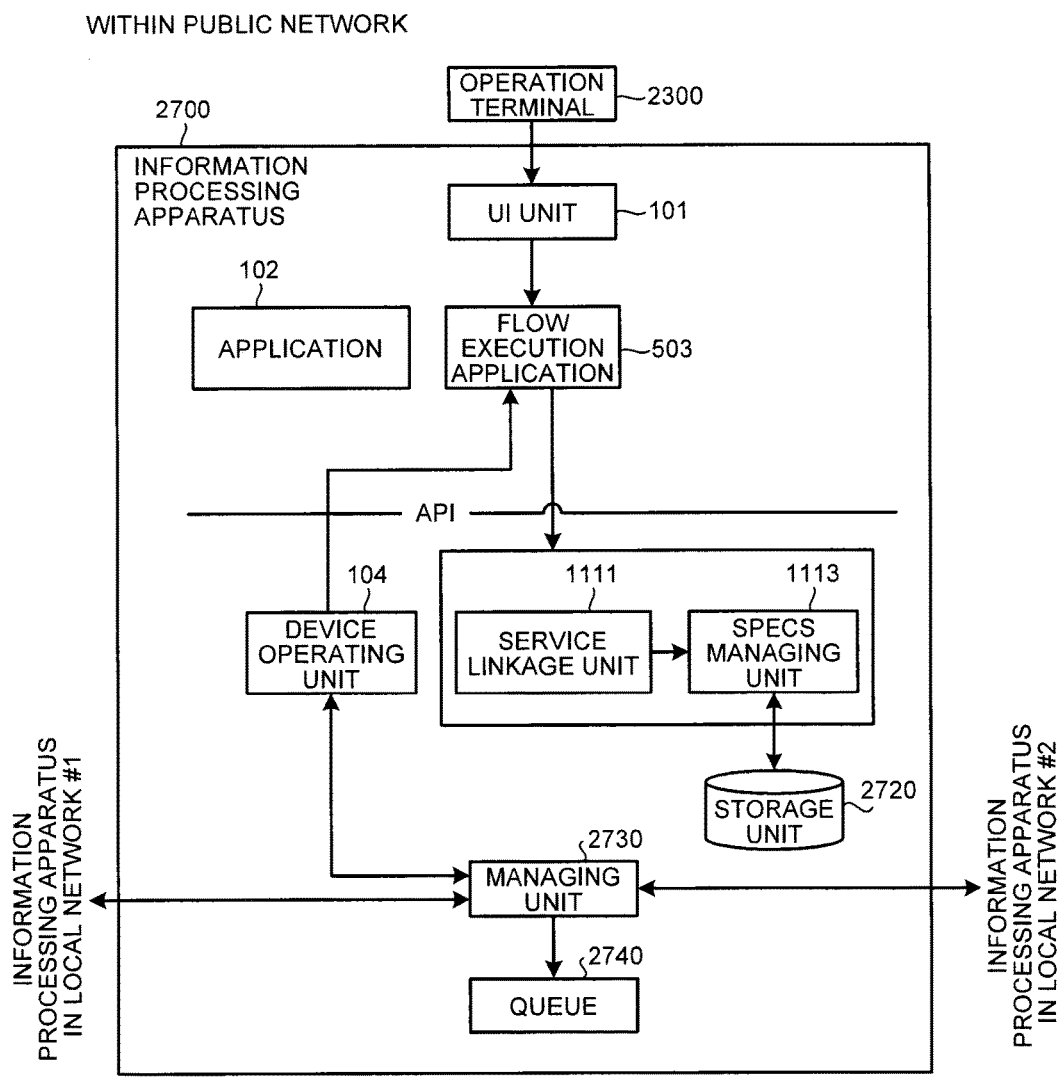
FIG. 28 is a block diagram of a functional configuration of an information processing apparatus in a public network of the tenth embodiment.

FIG. 28 is a block diagram of a functional configuration of the information processing apparatus 2700 in the public network in the tenth embodiment. As illustrated in FIG. 28, the information processing apparatus 2700 of the present embodiment mainly includes the UI unit 101, the application 102, the flow execution application 503, the device operating unit 104, the service linkage unit 1111, the specifications managing unit 1113, a storage unit 2720, a managing unit 2730, and a queue 2740. The UI unit 101, the application 102, the device operating unit 104, the flow execution application 503, the service linkage unit 1111, and the specifications managing unit 1113 have the same functions and configurations as described in the third embodiment. The information processing apparatus 2700 has the same API as described in the third embodiment.

The managing unit 2730 of the present embodiment receives specifications information of the input/output devices connected to the information processing apparatus 2800 in the local network #1 from the information processing apparatus 2800 in the local network #1, and stores the specifications information in the storage unit 2720 via the specifications managing unit 1113. The managing unit 2730 receives specifications information of a data conversion service from the information processing apparatus 2900 in the local network #2, and stores the specifications information in the storage unit 2720. The storage unit 2720 is a storage medium, such as an HDD or a memory, for storing the specifications information.

The managing unit 2730 temporarily stores a process registered in a linkage flow in the queue 2740 when executing the linkage flow generated by the service linkage unit 1111. The managing unit 2730 reads the process stored in the queue 2740 and sends requests for an input process and an output process to the information processing apparatus 2800 in the local network #1 or sends a request for a processing process to the information processing apparatus 2900 in the local network #2, in accordance with the process.

The queue 2740 is a first in/first out (FIFO) queue and is generated on a storage medium, such as a memory.

Figure 29:
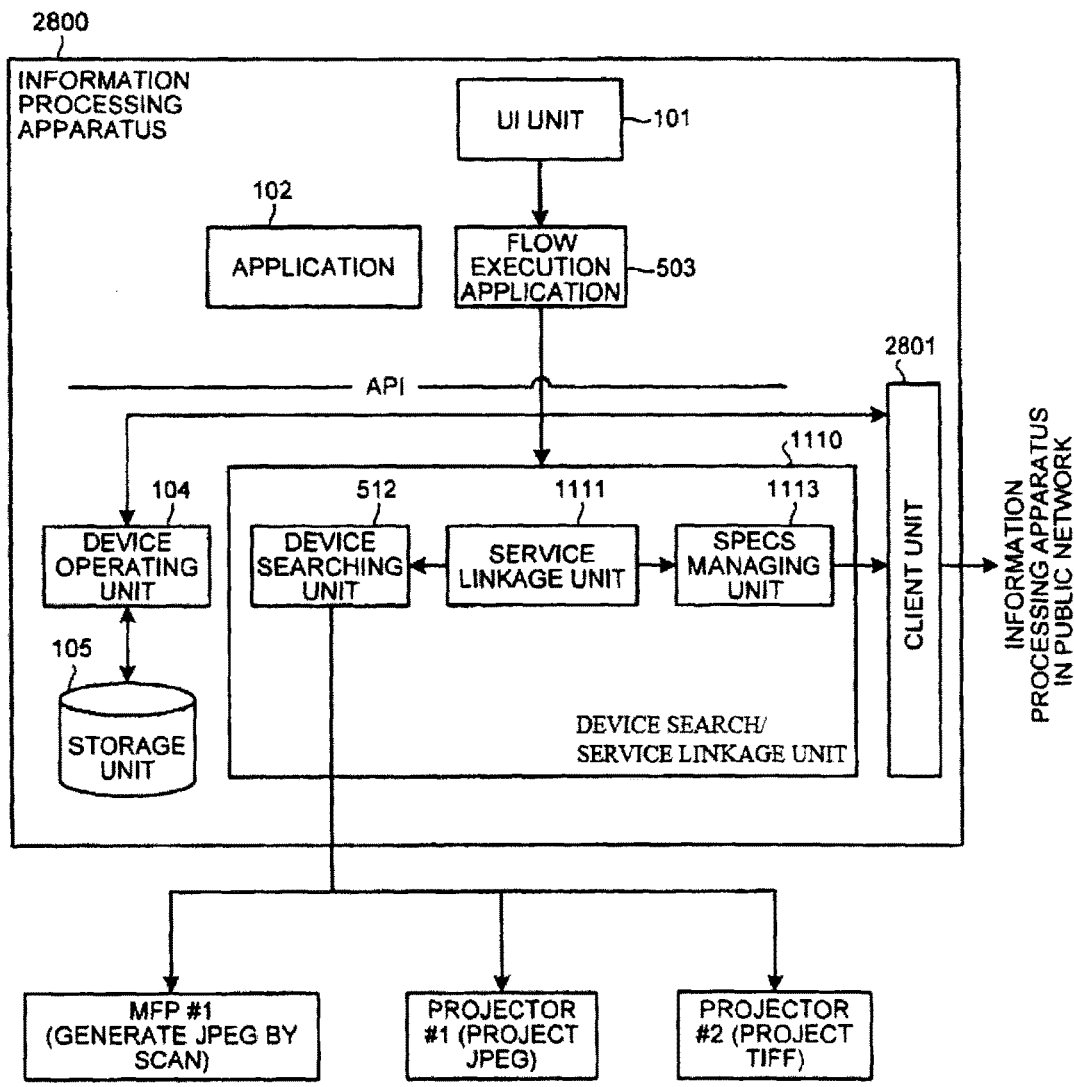
FIG. 29 is a block diagram of a functional configuration of an information processing apparatus in a local network #1 of the tenth embodiment.

FIG. 29 is a block diagram of a functional configuration of the information processing apparatus 2800 in the local network #1 in the tenth embodiment. As illustrated in FIG. 29, the information processing apparatus 2800 of the present embodiment mainly includes the UI unit 101, the application 102, the flow execution application 503, the device operating unit 104, the storage unit 105, the device search/service linkage unit 1110 including the device searching unit 512, the service linkage unit 1111, and the specifications managing unit 1113, and a client unit 2801. The UI unit 101, the application 102, the flow execution application 503, the device operating unit 104, the storage unit 105, the device searching unit 512, the service linkage unit 1111, and the specifications managing unit 1113 have the same functions and configurations as described in the third embodiment. The information processing apparatus 2800 includes the same API as described in the third embodiment.

The client unit 2801 sends specifications information of an input/output device acquired by the specifications managing unit 1113 to the information processing apparatus 2700 in a public network at regular time intervals. The client unit 2801 receives a request for an input process and a request for an output process from the information processing apparatus 2700 in the public network and sends the requests to the device operating unit 104 to execute the processes.

The projector #1 can project image data in a JPEG format and the projector #2 can project image data in a TIFF format, similarly to the second embodiment.

Figure 30:
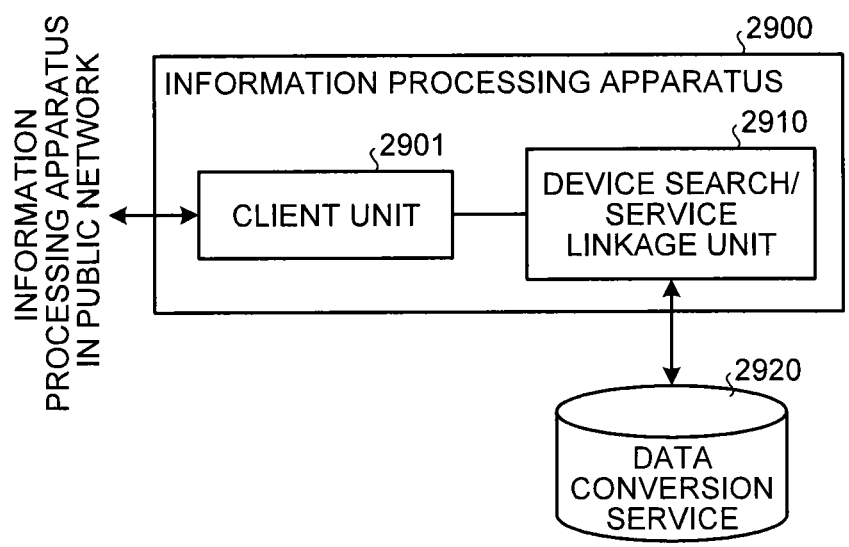
FIG. 30 is a block diagram of a functional configuration of an information processing apparatus in a local network #2.

FIG. 30 is a block diagram of a functional configuration of the information processing apparatus 2900 in the local network #2. As illustrated in FIG. 30, the information processing apparatus 2900 mainly includes a client unit 2901, a device search/service linkage unit 2910, and a data conversion service 2920.

The client unit 2901 sends specifications information of the data conversion service 2920 to the information processing apparatus 2700 in the public network. The client unit 2901 receives a request for a processing process from the information processing apparatus 2700 in the public network and sends the request to the device search/service linkage unit 2910.

The device search/service linkage unit 2910 receives the request for the processing process from the client unit 2901 and causes the data conversion service 2920 to perform data conversion. The device search/service linkage unit 2910 acquires specifications information from the data conversion service 2920 and sends the specifications information to the client unit 2901.

Figure 31:
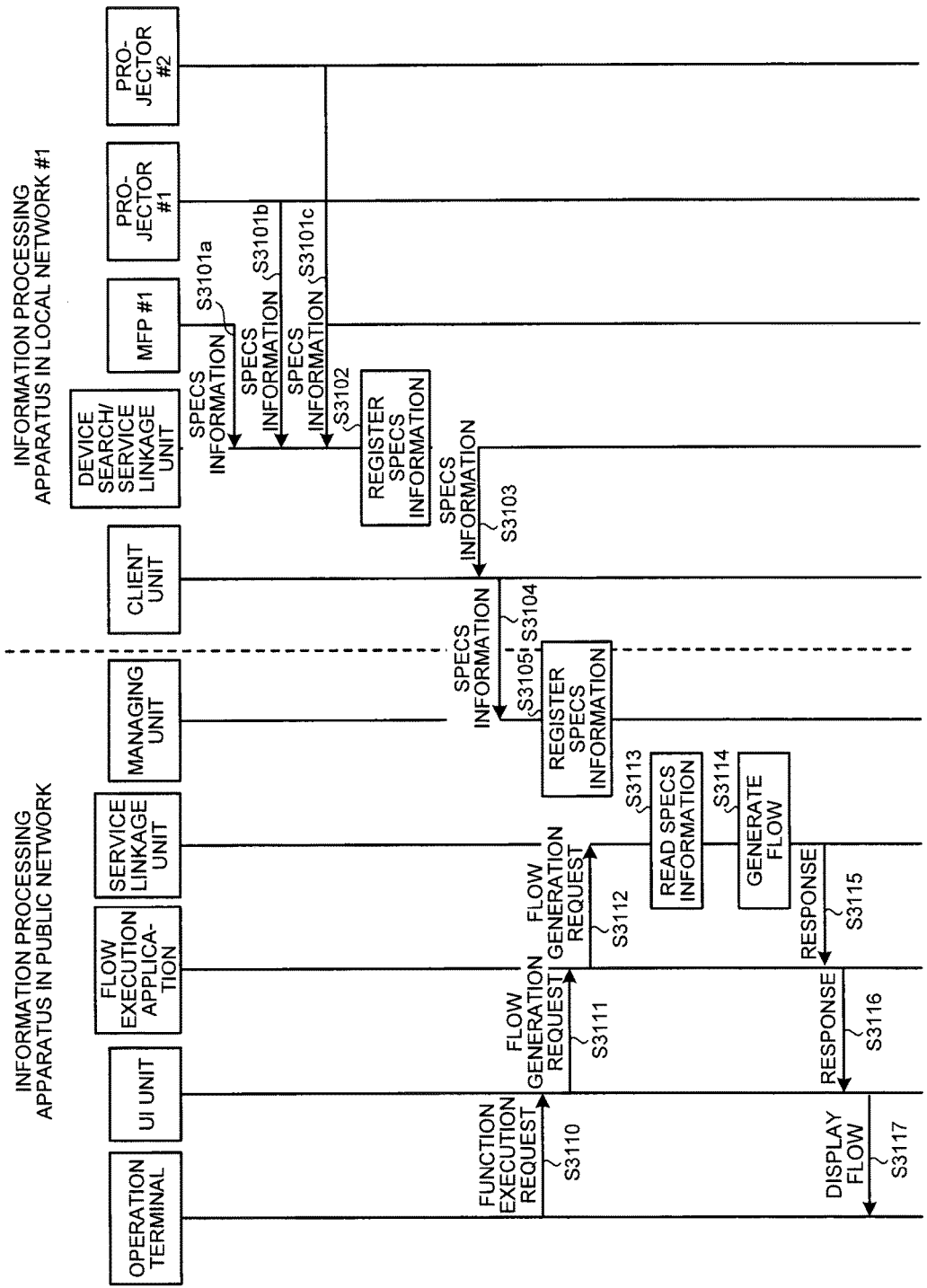
FIG. 31 is a sequence diagram of a flow of a linkage-flow generation process of the tenth embodiment.

A linkage-flow generation process performed by the information processing system of the present embodiment with the above configuration will be explained below. FIG. 31 is a sequence diagram of a flow of the linkage-flow generation process of the tenth embodiment.

The device search/service linkage unit 1110 of the information processing apparatus 2800 in the local network #1 acquires specifications information from the input/output devices, such as the MFP #1, the projector #1, and the projector #2, in the local network #1 (Steps S3101a, S3101b, and S3101c). The device search/service linkage unit 1110 of the information processing apparatus 2800 registers (stores) the acquired specifications information in the storage unit 105 (Step S3102).

The device search/service linkage unit 1110 reads the specifications information stored in the storage unit 105 at regular time intervals and sends the read specifications information to the client unit 2801 (Step S3103). The client unit 2801 sends the specifications information received from the device search/service linkage unit 1110 to the information processing apparatus 2700 in the public network at regular time intervals (Step S3104).

The managing unit 2730 of the information processing apparatus 2700 in the public network receives the specifications information sent by the information processing apparatus 2800 in the local network #1, and the specifications managing unit 1113 registers (stores) the received specifications information in the storage unit 2720 (Step S3105).

The user who has entered the meeting room sends a function execution request to the information processing apparatus 2700 in the public network via the operation terminal 2300 (Step S3110). An example is explained below in which the function execution request is a projection execution request with a designation of the ID of the projector #1. Specifically, the operation terminal 2300 sends the function execution request for "file+projection (the ID of the projector #1)" to the information processing apparatus 2700. In this example, the file is PDF image data to be projected. The operation terminal 2300 acquires the ID of the projector #1 in the same manner as described in the eighth embodiment.

When receiving the function execution request, the information processing apparatus 2700 performs the flow generation process in the same manner as described in the third embodiment. Specifically, the UI unit 101 of the information processing apparatus 2700 receives the function execution request and sends a flow generation request to the flow execution application 503 (Step S3111). The flow execution application 503 sends the received flow generation request to the service linkage unit 1111 (Step S3112).

When receiving the flow generation request, the service linkage unit 1111 reads the specifications information from the storage unit 105 (Step S3113), and generates a linkage flow based on the specifications information (Step S3114). In this example in which the function execution request for "file +projection (the ID of the projector #1)" is issued, the file is PDF image data and the input format of the projector is JPEG according to the specifications information; therefore, it is needed to convert the file to the JPEG format. Therefore, the service linkage unit 1111 refers to the specifications information of the data conversion service 2920 of the information processing apparatus 2900 in the local network #2 and registers data conversion to be performed by the data conversion service 2920 as a processing process in the linkage flow in addition to a projection output process.

Consequently, the service linkage unit 1111 generates a linkage flow of "processing process (conversion, file, conversion attribute (PDF-JPEG), the data conversion service 2920)+output process (projection, file, the ID of the projector #1)". In this case, if there are a plurality of input/output devices, such as the projectors, and data conversion services, a plurality of available linkage flows may be generated based on the specifications information.

When one or more linkage flows are generated as described above, the service linkage unit 1111 sends a response to the UI unit 101 via the flow execution application 503 (Steps S3115 and S3116). The UI unit 101 sends the generated linkage flows to the operation terminal 2300 and the linkage flows are displayed on the operation terminal 2300 (Step S3117).

Figure 32:
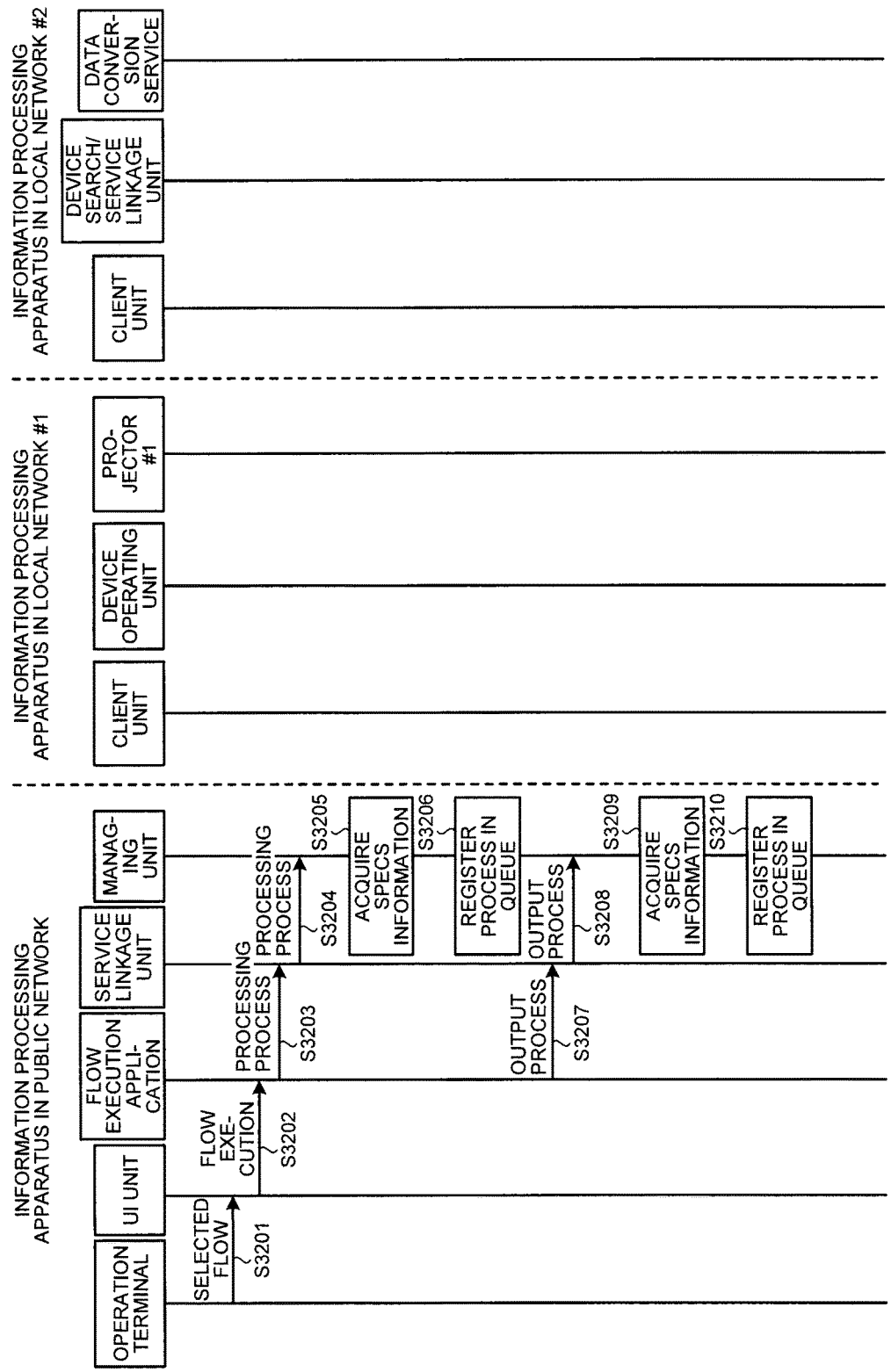
FIG. 32 is a sequence diagram of a flow of a flow execution process of the tenth embodiment.
Figure 33:
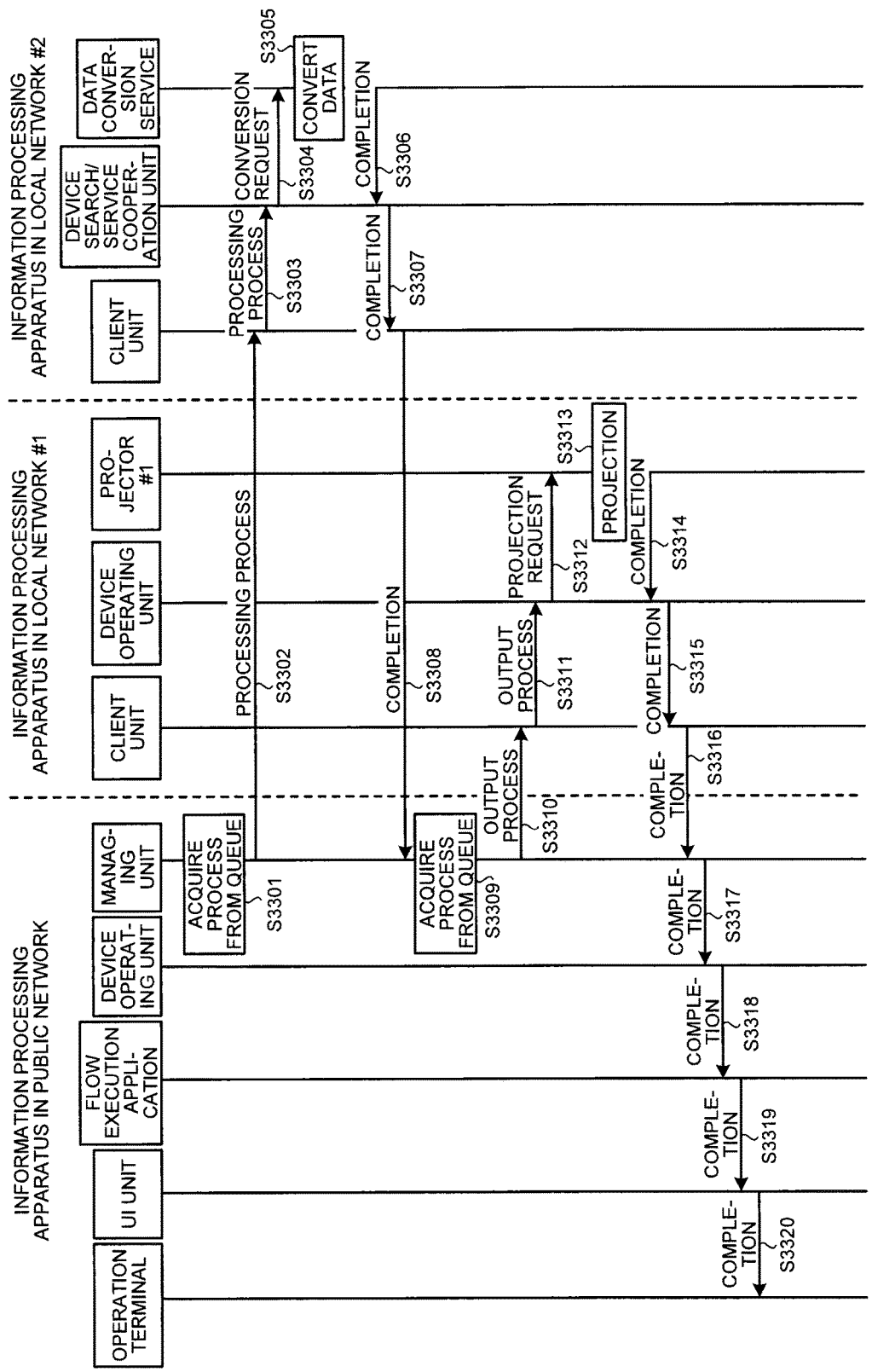
FIG. 33 is a sequence diagram of a flow of the flow execution process of the tenth embodiment.

FIGS. 32 and 33 are sequence diagrams illustrating a flow of a flow execution process of the tenth embodiment. When the linkage flows are displayed on the operation terminal 2300, the user sends a selection of a desired linkage flow to the UI unit 101 of the information processing apparatus 2700 (Step S3201). The UI unit 101 sends an execution request for the selected linkage flow to the flow execution application 503 (Step S3202).

The flow execution application 503 analyzes the linkage flow and sends requests for the processes registered in the linkage flow to the service linkage unit 1111 in order of the processes registered. In this example, the linkage flow of "processing process (conversion, file, conversion attribute (PDF-JPEG), the data conversion service 2920)+output process (projection, file, the ID of the projector #1) is registered. Therefore, the flow execution application 503 first sends a request for the processing process (processing process (conversion, file, conversion attribute (PDF-JPEG), the data conversion service 2920)) to the service linkage unit 1111 together with image data to be subjected to the processing process (Step S3203). The service linkage unit 1111 sends the request for the processing process to the managing unit 2730 (Step S3204). The managing unit 2730 acquires specifications information of the data conversion service 2920 from the storage unit 2720 (Step S3205), and registers the processing process (conversion, file, conversion attribute (PDF-JPEG), the data conversion service 2920) in the queue 2740 (Step S3206).

The flow execution application 503 sends a request for the output process (output process (projection, file, the ID of the projector #1)), which is registered subsequent to the processing process in the linkage flow, to the service linkage unit 1111 (Step S3207). The service linkage unit 1111 sends the request for the output process to the managing unit 2730 (Step S3208). The managing unit 2730 acquires specifications information of the projector #1 from the storage unit 2720 (Step S3209), and registers the output process (projection, file, the ID of the projector #1) in the queue 2740 (Step S3210).

The managing unit 2730 acquires the registered processes from the queue 2740 (Step S3301). The processing process is first registered in the queue 2740; therefore, the managing unit 2730 sends a request for the processing process (conversion, file, conversion attribute (PDF-JPEG), the data conversion service 2920) to the information processing apparatus 2900 in the local network #2 (Step S3302).

The client unit 2901 of the information processing apparatus 2900 in the local network #2 receives the request for the processing process and sends the request to the device search/service linkage unit 2910 (Step S3303). The device search/service linkage unit 2910 sends a data conversion request to the data conversion service 2920 together with the image data indicated by the file designated in the request for the processing process (Step S3304).

Accordingly, the data conversion service 2920 performs data conversion of the file (Step S3305). When the data conversion is complete, the data conversion service 2920 sends a notice of completion and the converted file to the information processing apparatus 2700 in the public network (Steps S3306, S3307, and S3308).

The managing unit 2730 of the information processing apparatus 2700 in the public network subsequently acquires the process that is subsequently registered in the queue 2740 (Step S3309). The output process is registered subsequent to the processing process in the queue 2740; therefore, the managing unit 2730 sends a request for the output process (output process (projection, file, the ID of the projector #1)) to the information processing apparatus 2800 in the local network #1 together with the file that is obtained by the data conversion (Step S3310).

The client unit 2801 of the information processing apparatus 2800 in the local network #1 receives the request for the output process and sends the request to the device operating unit 104 (Step S3311). The device operating unit 104 sends a projection request and the converted file to the projector #1 that is designated by the ID (Step S3312). The projector #1 performs the projection process on the converted file as designated in the projection process (Step S3313).

When completing the projection process, the projector #1 sends a notice of completion to the information processing apparatus 2800 (Step S3314). The information processing apparatus 2800 sends the notice of completion to the information processing apparatus 2700 in the public network (Steps S3315 and S3316).

The managing unit 2730 of the information processing apparatus 2700 in the public network receives the notice of completion, and sends the notice of completion to the operation terminal 2300 via the device operating unit 104, the flow execution application 503, and the UI unit 101 (Steps S3317, S3318, S3319, and S3320).

As described above, according to the present embodiment, when a user enters a meeting room and uses an input/output device in the local network #1 in the meeting room, and if the operation terminal 2300 used by the user is not connectable to the local network #1, it is possible to execute the input/output function of the input/output device by sending a process request to the information processing apparatus 2700 in the public network via the access to the information processing apparatus 2700, which is convenient for the user.

Eleventh Embodiment

Figure 34:
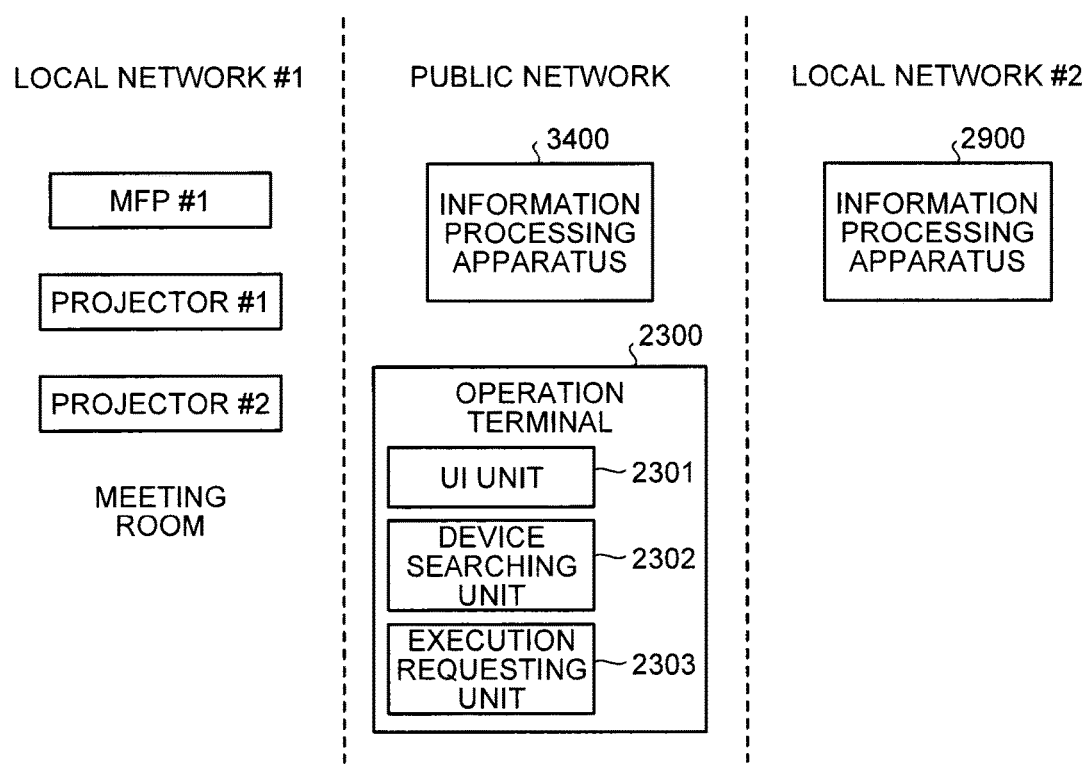
FIG. 34 is a network configuration diagram according to an eleventh embodiment.

FIG. 34 is a network configuration diagram according to an eleventh embodiment. As illustrated in FIG. 34, an information processing system of the present embodiment includes two information processing apparatuses 3400 and 2900 and input/output devices, such as the MFP #1, the projector #1, and the projector #2.

As illustrated in FIG. 34, the input/output devices, such as the MFP #1, the projector #1, and the projector #2, are located in the local network #1 (first network). The information processing apparatus 3400 is located in the public network (second network). The information processing apparatus 2900 is located in the local network #2 (third network).

The input/output devices, such as the MFP #1, the projector #1, and the projector #2, and the information processing apparatus 3400 are accessible to one another. The information processing apparatus 2900 and the information processing apparatus 3400 are accessible to each other. The information processing apparatus 2900 in the local network #2 has the same configuration as described in the tenth embodiment.

The input/output devices, such as the MFP #1, the projector #1, and the projector #2, are installed in a meeting room and connected to the local network #1. The projector #1 can project image data in a JPEG format and the projector #2 can project image data in a TIFF format, similarly to the second embodiment.

A user carrying the operation terminal 2300 enters the meeting room and uses the input/output devices in the meeting room. In the present embodiment, to use the input/output devices in the meeting room via the operation terminal 2300, the operation terminal 2300 is connected to the information processing apparatus 3400 in the public network. A detailed explanation will be given below.

Figure 35:
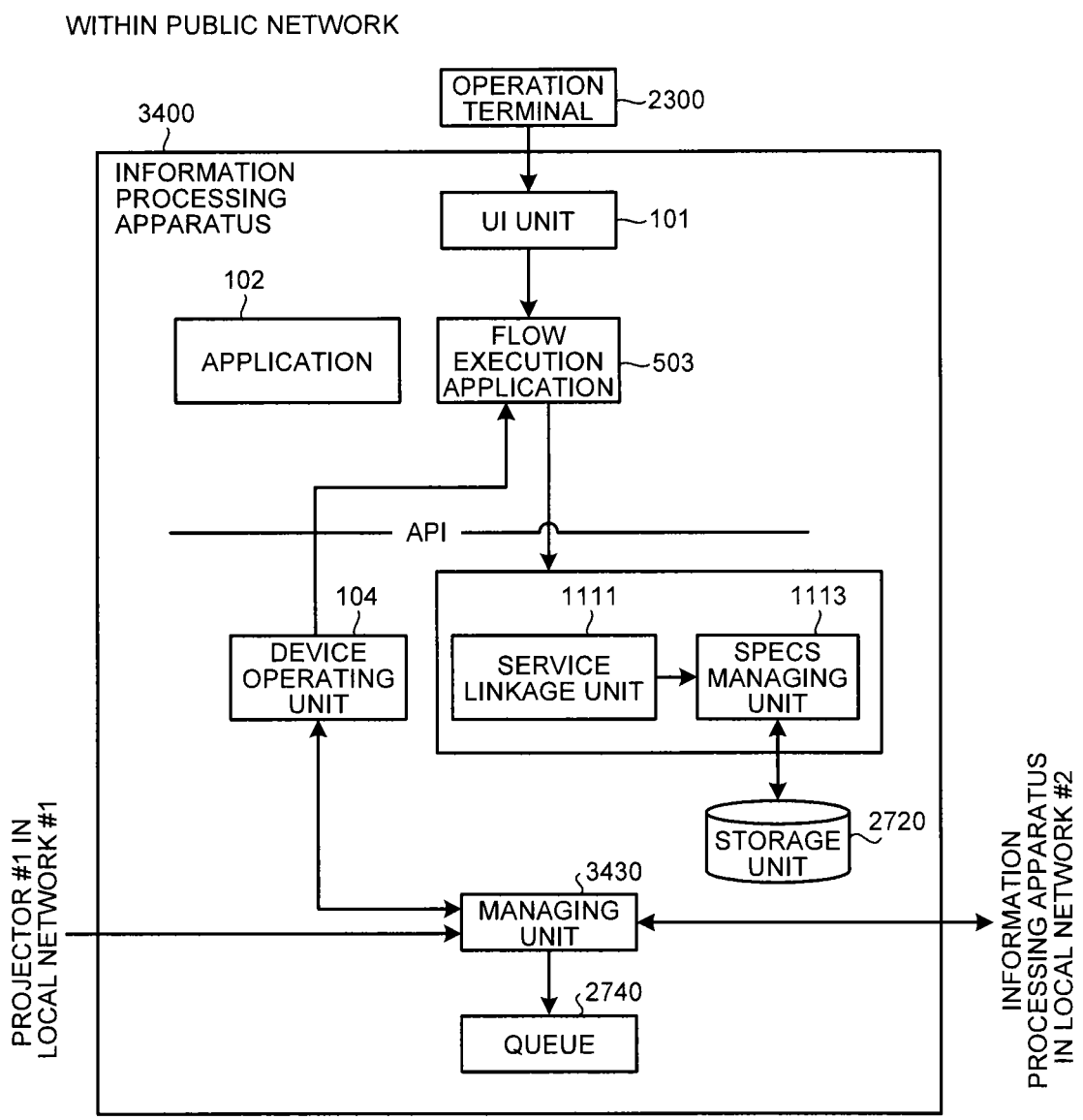
FIG. 35 is a block diagram of a functional configuration of an information processing apparatus in a public network of the eleventh embodiment.

FIG. 35 is a block diagram of a functional configuration of the information processing apparatus 3400 in the public network in the eleventh embodiment. As illustrated in FIG. 35, the information processing apparatus 3400 mainly includes the UI unit 101, the application 102, the flow execution application 503, the device operating unit 104, the service linkage unit 1111, the specifications managing unit 1113, the storage unit 2720, a managing unit 3430, and the queue 2740. The UI unit 101, the application 102, the device operating unit 104, the flow execution application 503, the service linkage unit 1111, the specifications managing unit 1113, the storage unit 2720, and the queue 2740 have the same functions and configurations as described in the tenth embodiment. The information processing apparatus 3400 includes the same API as described in the third embodiment. The managing unit 3430 of the present embodiment receives specifications information from each of the input/output devices, such as the MFP #1, the projector #1, and the projector #2, in the local network at regular time intervals, and stores the received specifications information in the storage unit 2720 via the specifications managing unit 1113. The specifications managing unit 1113 sends a request for processes registered in the linkage flow registered in the storage unit 2720 to the input/output devices, such as the MFP #1, the projector #1, and the projector #2, and causes each of the input/output devices to execute functions. The managing unit 3430 has the same functions as described in the tenth embodiment.

Figure 36:
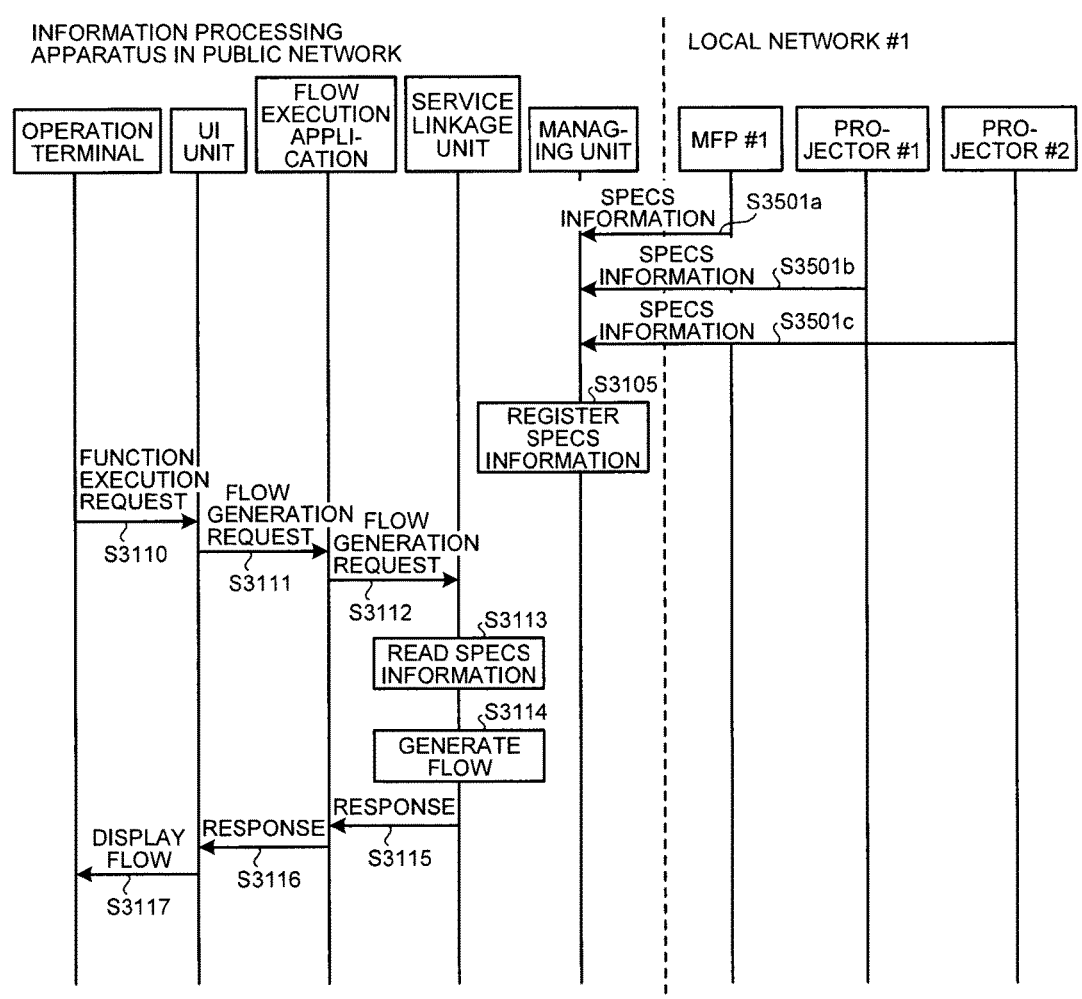
FIG. 36 is a sequence diagram of a flow of a linkage-flow generation process of the eleventh embodiment.

A linkage-flow generation process performed by the information processing system of the present embodiment with the above configuration will be explained below. FIG. 36 is a sequence diagram of a flow of the linkage-flow generation process of the eleventh embodiment.

The managing unit 3430 of the information processing apparatus 3400 in the public network receives specifications information from each of the input/output devices, such as the MFP #1, the projector #1, and the projector #2, in the local network #1 at regular time intervals (Steps S3501a, S3501b, and S3501c). The managing unit 3430 receives the specifications information sent by the input/output device in the local network #1 and the specifications managing unit 1113 registers (stores) the received specifications information in the storage unit 2720 (Step S3105).

The user who has entered the meeting room sends a function execution request to the information processing apparatus 3400 in the public network via the operation terminal 2300 (Step S3110). Therefore, a linkage flow is generated and displayed by the operation terminal 2300 in the same manner as the linkage-flow generation process described in the tenth embodiment illustrated in FIG. 31 (Steps S3111 to S3117).

FIG. 37 is a sequence diagram illustrating a flow of a flow execution process of the eleventh embodiment. When the linkage flow is displayed on the operation terminal 2300, a user selects a desired linkage flow and processes registered in the selected linkage flow are registered in the queue 2740 through the same processes as described in the tenth embodiment illustrated in FIG. 32. In the present embodiment, the linkage flow of "processing process (conversion, file, conversion attribute (PDF-JPEG), the information processing apparatus 2900)+output process (projection, file, the ID of the projector #1)" is generated.

The managing unit 3430 acquires the registered processes from the queue 2740 (Step S3301). The processing process is first registered in the queue 2740; therefore, the managing unit 2730 sends a request for the processing process (conversion, file, conversion attribute (PDF-JPEG), the data conversion service 2920) to the information processing apparatus 2900 in the local network #2 (Step S3302).

The client unit 2901 of the information processing apparatus 2900 in the local network #2 receives the request for the processing process and sends the request to the device search/service linkage unit 2910 (Step S3303). The device search/service linkage unit 2910 sends a data conversion request to the data conversion service 2920 together with the image data indicated by the file designated in the request for the processing process (Step S3304).

Accordingly, the data conversion service 2920 performs data conversion of the file (Step S3305). When the data conversion is complete, the data conversion service 2920 sends a notice of completion and the converted file to the information processing apparatus 3400 in the public network (Steps S3306, S3307, and S3308).

The managing unit 3430 of the information processing apparatus 3400 in the public network subsequently acquires the process that is subsequently registered in the queue 2740 (Step S3309). The output process is registered subsequent to the processing process in the queue 2740; therefore, the managing unit 2730 sends a request for the output process (output process (projection, file, the ID of the projector #1) to the projector #1 in the local network #1 together with the file that is subjected to the data conversion (Step S3601). The projector #1 performs a projection process on the data-converted file as designated in the projection request (Step S3602).

When the projection process is complete, the projector #1 sends a notice of completion to the information processing apparatus 3400 in the public network (Step S3603). The managing unit 3430 of the information processing apparatus 3400 receives the notice of completion and the managing unit 3430 sends the notice of completion to the operation terminal 2300 via the device operating unit 104, the flow execution application 503, and the UI unit 101 (Steps S3317, S3318, S3319, and S3320).

As described above, according to the present embodiment, when a user enters a meeting room and uses an input/output device in the local network #1 in the meeting room, and if the operation terminal 2300 used by the user is not connectable to the local network #1, it is possible to execute the input/output function of the input/output device by sending a process request to the information processing apparatus 3400 in the public network via the access to the information processing apparatus 3400, which is convenient for the user.

The information processing apparatus of each of the first to the eleventh embodiments and modifications has a hardware configuration including a control device, such as a central processing unit (CPU); a storage device, such as a read only memory (ROM) or a random access memory (RAM); an external storage device, such as an HDD or a compact-disc (CD) drive; a display device, such as a display; and an input device, such as a keyboard or a mouse.

A device linkage program executed by the information processing apparatus of each of the first to the eleventh embodiments and modifications is provided by being recorded in a computer-readable recording medium, such as a CD-ROM, a flexible disk (FD), a CD-R, or a digital versatile disk (DVD), in a computer-installable or a computer-executable format.

The device linkage program executed by the information processing apparatus of each of the first to the eleventh embodiments and modifications may be stored in a computer connected to a network, such as the Internet, and be provided by downloading via the network. The device linkage program executed by the information processing apparatus of each of the first to the eleventh embodiments and modifications may be provided or distributed via the network, such as the Internet.

The device linkage program executed by the information processing apparatus of each of the first to the eleventh embodiments and modifications may be provided by being pre-installed in a ROM or the like.

The device linkage program executed by the information processing apparatus of each of the first to the eleventh embodiments and modifications has a module structure including the above units (the UI unit, the flow execution application, the device operating unit, the device searching unit, and the service linkage unit). As actual hardware, a CPU (processor) reads and executes the device linkage program from the above-mentioned storage medium to load the above units on a main storage device, so that the UI unit, the flow execution application, the device operating unit, the device searching unit, and the service linkage unit are generated on the main storage device.

According to the embodiments, it is possible to easily cause an input device, an output device, and other external devices to link each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
a memory that stores information indicating specifications of a plurality of electronic devices; and
a control device configured to
control a display to display a plurality of first processes for generating electronic data and a plurality of second processes that use the electronic data;
receive a selection of one of the plurality of first processes;
receive a selection of one of the plurality of second processes;
transmit a first instruction, over a network, to a first electronic device to control the first electronic device to perform the one of the plurality of first processes based on the information stored in the memory; and
transmit a second instruction, over the network, to a second electronic device to control the second electronic device to perform the one of the plurality of second processes using the electronic data generated by the first electronic device performing the one of the plurality of first processes.

2. The information processing apparatus according to claim 1, wherein the control device is further configured to
acquire pieces of information that each indicate specifications of a corresponding electronic device of the plurality of electronic devices that are connected to the information processing apparatus; and
store the acquired pieces of information in the memory.

3. The information processing apparatus according to claim 1, wherein the control device is configured to
control the display to display a first group of electronic devices that execute the one of the plurality of first processes based on the information stored in the memory, the first electronic device included in the first group of electronic devices;
receive a selection of one electronic device of the first group of electronic devices;
control the display to display a second group of electronic devices for executing the one of the plurality of second processes based on the information stored in the memory;
receive a selection of one electronic device of the second group of electronic devices;
control the one of the first group of electronic devices to perform the one of the plurality of first processes; and
control the one of the second group of electronic devices to perform the one of the plurality of second processes using the electronic data generated by the one of the first group of electronic devices performing the one of the plurality of first processes.

4. The information processing apparatus according to claim 3, wherein
the one of the first group of electronic devices has a scan function, and the one of the plurality of first processes is for storing, in the memory, image data acquired by the one of the first group of electronic devices by scanning a document.

5. The information processing apparatus according to claim 4, wherein
the one of the second group of electronic devices has a projection function, and
the one of the plurality of second processes is for projecting, by the one of the second group of electronic devices, image data stored in the memory by the one of the first group of electronic devices performing the one of the plurality of first processes.

6. The information processing apparatus according to claim 1, wherein the control device receives the selection of the one of the plurality of first processes via to a user input to an operation terminal.

7. The information processing apparatus according to claim 1, wherein the control device receives the selection of the one of the plurality of second processes via to a user input to an operation terminal.

8. The information processing apparatus according to claim 1, wherein the control device is further configured to
receive, from the first electronic device via the network, information indicating specifications of the first electronic device; and
determine to control the first electronic device based on the information received from the first electronic device, wherein
the control device transmits the first instruction to the first electronic device based on the determination to control the first electronic device.

9. The information processing apparatus according to claim 8, wherein the control device is further configured to
receive, from the second electronic device via the network, information indicating specifications of the second electronic device; and
determine to control the second electronic device based on the information received from the second electronic device, wherein
the control device transmits the second instruction to the second electronic device based on the determination to control the second electronic device and the transmission of the first instruction to the first electronic device.

10. The information processing apparatus according to claim 1, wherein
the control device is further configured to determine the first electronic device and the second electronic device of the plurality of electronic devices according to the information stored in the memory, and
the control device transmits the first instruction and the second instruction based on the determination of the first electronic device and the second electronic device.

11. An information processing method, comprising:
storing, in a memory of an information processing apparatus, information indicating specifications of a plurality of electronic devices;
controlling a display to display a plurality of first processes for generating electronic data and a plurality of second processes that use the electronic data;
receiving a selection of one of the plurality of first processes;
receiving a selection of one of the plurality of second processes;
transmitting, by a control device, a first instruction over a network to a first electronic device to control the first electronic device to perform the one of the plurality of first processes based on the information stored in the memory; and
transmitting, by the control device, a second instruction over the network to a second electronic device to control the second electronic device to perform the one of the plurality of second processes using the electronic data generated by the first electronic device performing the first one of the plurality of first processes.

12. The information processing method according to claim 11, further comprising:
acquiring pieces of information that each indicate specifications of a corresponding electronic device of the plurality of electronic devices that are connected to the information processing apparatus; and
storing the acquired pieces of information in the memory.

13. The information processing method according to claim 11, further comprising:
controlling the display to display a first group of electronic devices that execute the one of the plurality of first processes based on the information stored in the memory, the first electronic device included in the first group of electronic devices;
receiving a selection of one electronic device of the first group of electronic devices;
controlling the display to display a second group of electronic devices for executing the one of the plurality of second processes based on the information stored in the memory;
receiving a selection of one electronic device of the second group of electronic devices;
controlling the one of the first group of electronic devices to perform the one of the plurality of first processes; and
controlling the one of the second group of electronic devices to perform the one of the plurality of second processes using the electronic data generated by the one of the first group of electronic devices performing the one of the plurality of first processes.

14. The information processing method according to claim 13, wherein
the one of the first group of electronic devices has a scan function, and
the one of the plurality of first processes is for storing, in the memory, image data acquired by the one of the first group of electronic devices by scanning a document.

15. The information processing method according to claim 14, wherein
the one of the second group of electronic devices has a projection function, and
the one of the plurality of second processes is for projecting, by the one of the second group of electronic devices, image data stored in the memory by the one of the first group of electronic devices performing the one of the plurality of first processes.

16. A non-transitory computer readable medium storing computer executable instructions that, when executed by a control device of an information processing apparatus, cause the information processing apparatus to:
store, in a memory, information indicating specifications of a plurality of electronic devices;
control a display to display a plurality of first processes for generating electronic data and a plurality of second processes that use the electronic data;
receive a selection of one of the plurality of first processes;

receive a selection of one of the plurality of second processes;

transmit a first instruction, over a network to a first electronic device, to control the first electronic device to perform the one of the plurality of first processes based on the information stored in the memory; and transmit a second instruction, over the network to a second electronic device, to control the second electronic device to perform the one of the plurality of second processes using the electronic data generated by the first electronic device performing the first one of the plurality of first processes.

17. The non-transitory computer readable medium according to claim 16, wherein the information processing apparatus is further caused to:

acquire pieces of information that each indicate specifications of a corresponding electronic device of the plurality of electronic devices that are connected to the information processing apparatus; and store the acquired pieces of information in the memory.

18. The non-transitory computer readable medium according to claim 16, wherein the information processing apparatus is further caused to:

control the display to display a first group of electronic devices that execute the one of the plurality of first processes based on the information stored in the memory, the first electronic device included in the first group of electronic devices;

receive a selection of one electronic device of the first group of electronic devices;

control the display to display a second group of electronic devices for executing the one of the plurality of second processes based on the information stored in the memory;

receive a selection of one electronic device of the second group of electronic devices;

control the one of the first group of electronic devices to perform the one of the plurality of first processes; and control the one of the second group of electronic devices to perform the one of the plurality of second processes using the electronic data generated by the one of the first group of electronic devices performing the one of the plurality of first processes.

19. The non-transitory computer readable medium according to claim 18, wherein the one of the first group of electronic devices has a scan function, and the one of the plurality of first processes is for storing, in the memory, image data acquired by the one of the first group of electronic devices by scanning a document.

20. The non-transitory computer readable medium according to claim 19, wherein the one of the second group of electronic devices has a projection function, and the one of the plurality of second processes is for projecting, by the one of the second group of electronic devices, image data stored in the memory by the one of the first group of electronic devices performing the one of the plurality of first processes.

* * * * *